United States Patent
Agassy et al.

(10) Patent No.: US 10,262,188 B2
(45) Date of Patent: Apr. 16, 2019

(54) LIVENESS AND SPOOF DETECTION FOR ULTRASONIC FINGERPRINT SENSORS

(71) Applicant: QUALCOMM Incorporated, San Diego, CA (US)

(72) Inventors: Meir Agassy, Ramat Gan (IL); Boaz Castro, Tel Aviv (IL); Arye Lerner, Kfar Yona (IL); Gal Rotem, Hod Hasharon (IL); Liran Galili, Givatayim (IL); Nathan Altman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 15/432,125

(22) Filed: Feb. 14, 2017

(65) Prior Publication Data

US 2017/0231534 A1  Aug. 17, 2017

Related U.S. Application Data

(60) Provisional application No. 62/295,490, filed on Feb. 15, 2016.

(51) Int. Cl.
*G06K 9/00* (2006.01)

(52) U.S. Cl.
CPC ......... *G06K 9/00107* (2013.01); *G06K 9/001* (2013.01); *G06K 9/0002* (2013.01); *G06K 9/0012* (2013.01)

(58) Field of Classification Search
CPC ............. G06K 9/0002; G06K 9/00107; G06K 9/00067; G06K 9/001; G06K 9/0012;
(Continued)

(56) References Cited

U.S. PATENT DOCUMENTS 7,433,729 B2    10/2008  Setlak et al.
2009/0232397 A1  9/2009  Hara
(Continued)

FOREIGN PATENT DOCUMENTS

WO    WO-2015130809 A1   9/2015
WO    WO-2015134816 A1   9/2015

OTHER PUBLICATIONS

Galbally J., et al., "A High Performance Fingerprint Liveness Detection Method Based on Quality Related Features", Future Generations Computer Systems, Elsevier Science Publishers, Amsterdam, NL, vol. 28, No. 1, Nov. 29, 2010 (Nov. 29, 2010), XP028293366, pp. 311-321.

(Continued)

*Primary Examiner* — Li Liu
(74) *Attorney, Agent, or Firm* — Silicon Valley Patent Group LLP

(57) ABSTRACT

Embodiments of apparatuses and methods for detecting a spoof finger are disclosed. In one embodiment, an ultrasonic fingerprint sensor comprises an ultrasonic transmitter configured to transmit an ultrasonic wave to a finger, an ultrasonic sensor array configured to receive a reflected ultrasonic wave from the finger, and a controller configured to determine a reflected acoustic energy of the finger based on a difference between average amplitudes of the reflected ultrasonic wave from ridges and valleys of the finger; and determine whether the finger is a spoof based at least in part on the reflected acoustic energy of the finger.

27 Claims, 14 Drawing Sheets

(58) Field of Classification Search
CPC ........... G06K 9/00013; G06K 9/00087; G06K 9/00114; G06K 9/0008; G06K 9/00899
See application file for complete search history.

(56) References Cited

U.S. PATENT DOCUMENTS

| | | | | |
|---|---|---|---|---|
| 2014/0354823 | A1* | 12/2014 | Kitchens | G06F 1/3215 348/163 |
| 2015/0241393 | A1* | 8/2015 | Ganti | G01N 29/09 73/589 |
| 2016/0063294 | A1* | 3/2016 | Du | G06K 9/0002 382/124 |
| 2016/0070967 | A1* | 3/2016 | Du | G06K 9/00093 382/124 |
| 2016/0246396 | A1* | 8/2016 | Dickinson | G06F 3/03545 |
| 2016/0313439 | A1* | 10/2016 | Min | G01S 7/539 |
| 2016/0350573 | A1* | 12/2016 | Kitchens, II | G06K 9/0002 |
| 2016/0379038 | A1* | 12/2016 | Vural | G06K 9/0008 382/125 |
| 2017/0004347 | A1* | 1/2017 | Agassy | G06K 9/0002 |
| 2017/0316243 | A1* | 11/2017 | Ghavanini | G06F 3/044 |
| 2018/0031686 | A1* | 2/2018 | Kuo | G06K 9/0002 |

OTHER PUBLICATIONS

International Search Report and Written Opinion—PCT/US2017/017917—ISA/EPO—dated May 10, 2017.
Marasco E., "A A Survey on Anti-Spoofing Schemes for Fingerprint Recognition Systems", ACM Computing Surveys. vol. 47, No. 2, Jan. 31, 2015 (Jan. 31, 2015), XP055367539, pp. 1-36.

* cited by examiner

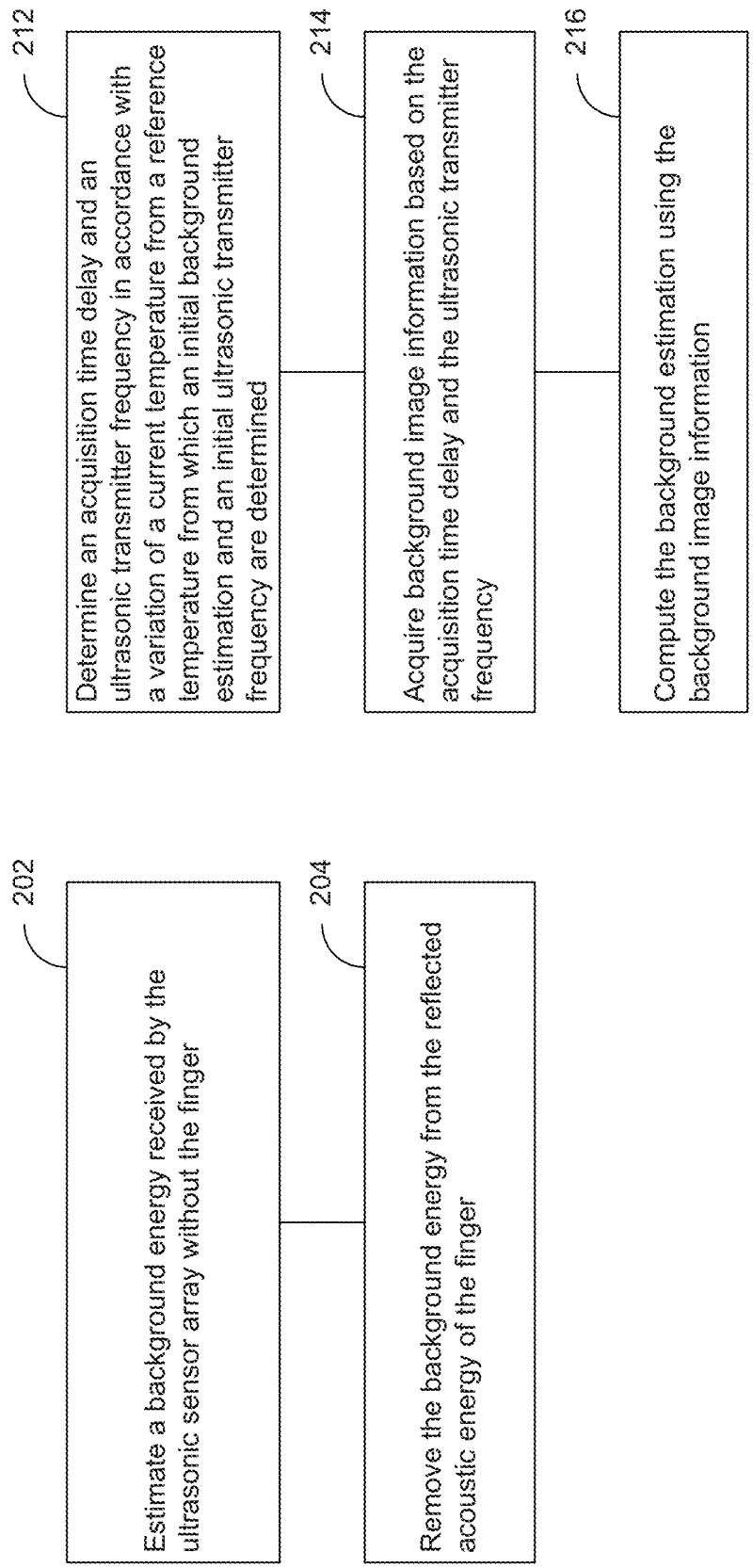

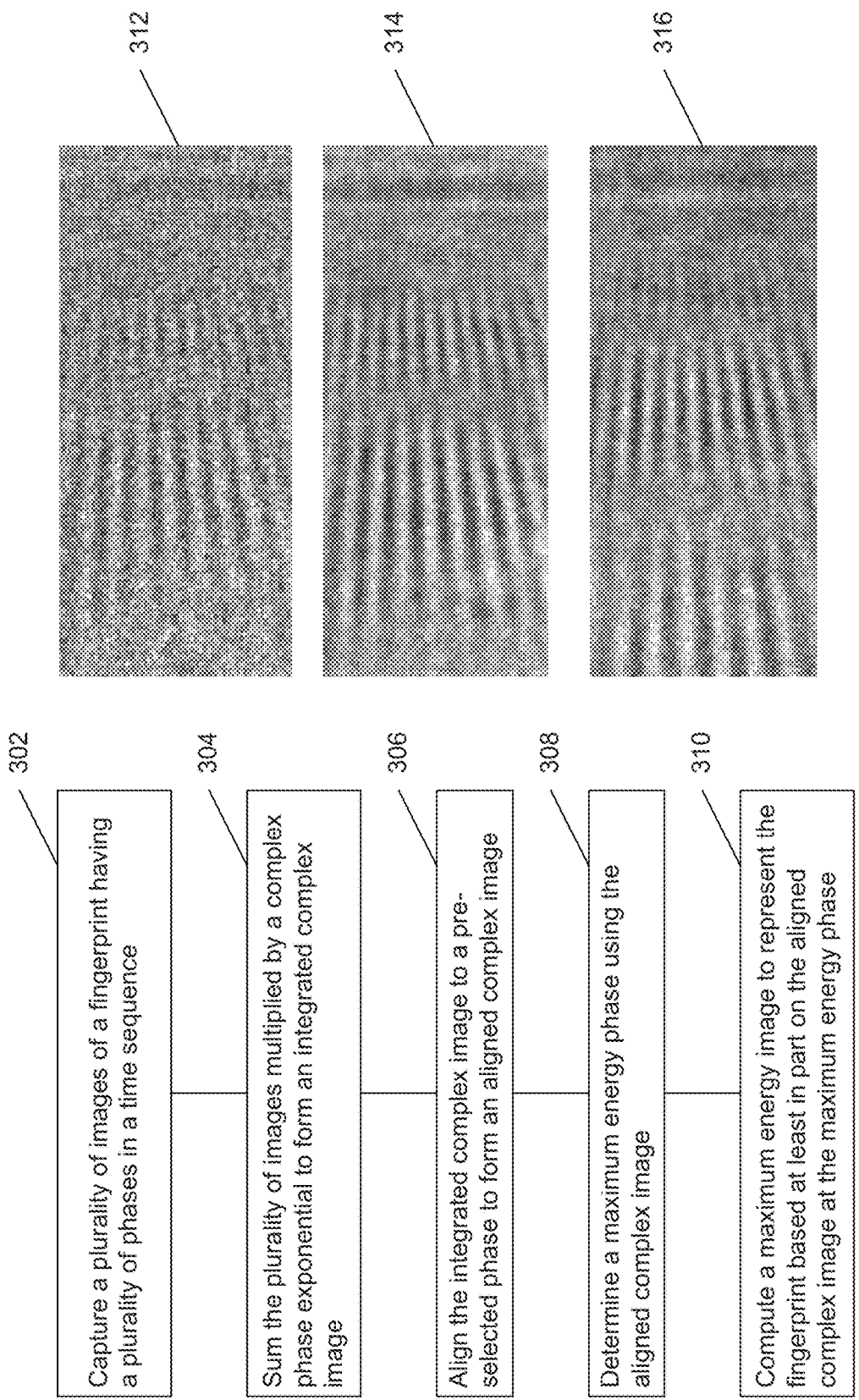

FIG. 3A

302 Capture a plurality of images of a fingerprint having a plurality of phases in a time sequence 304 Sum the plurality of images multiplied by a complex phase exponential to form an integrated complex image 306 Align the integrated complex image to a pre-selected phase to form an aligned complex image 308 Determine a maximum energy phase using the aligned complex image 310 Compute a maximum energy image to represent the fingerprint based at least in part on the aligned complex image at the maximum energy phase

FIG. 3B 312
314
316

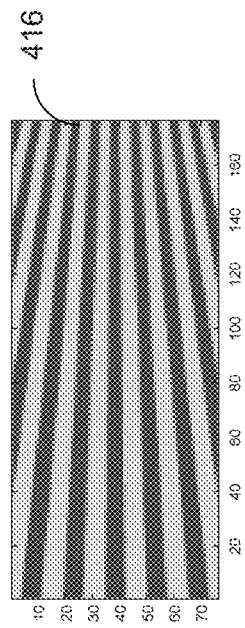
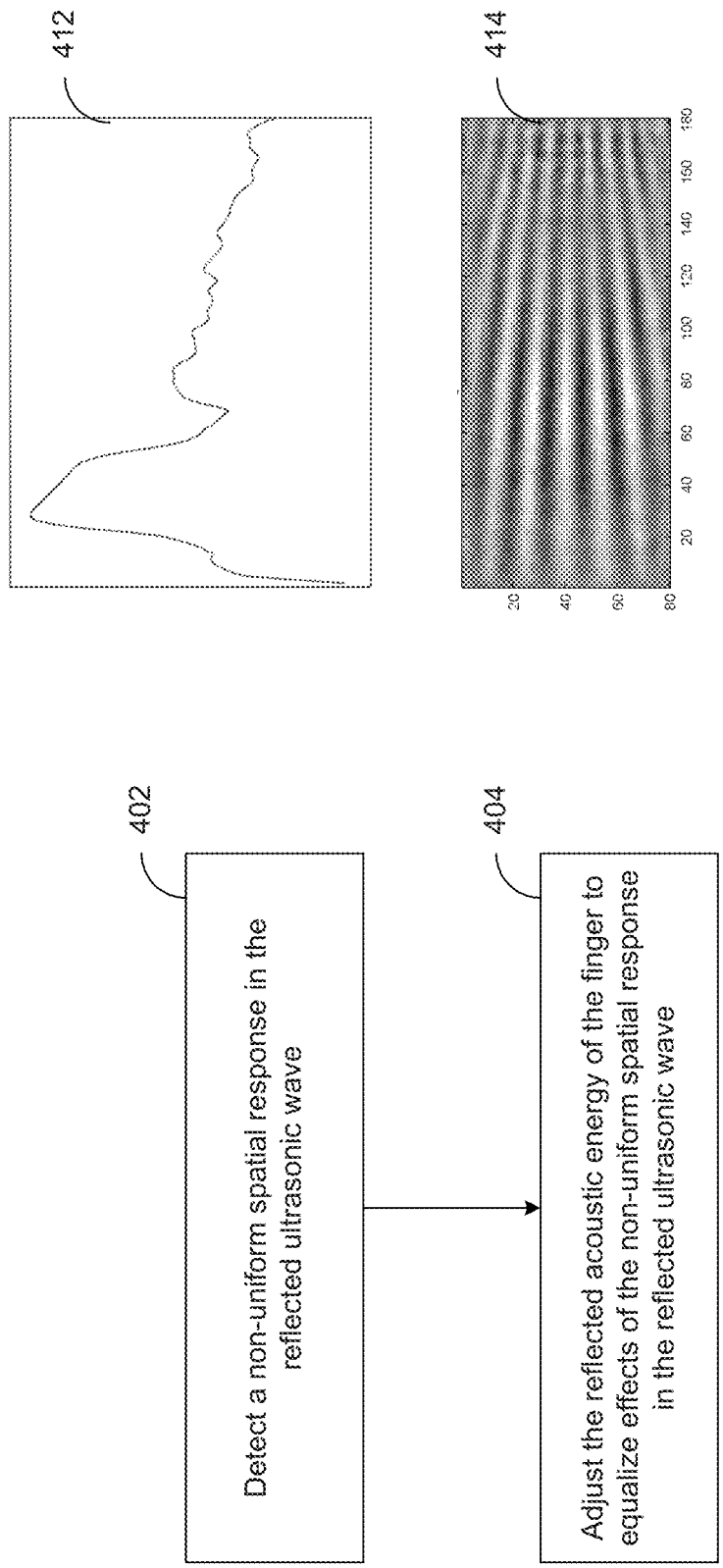
FIG. 4B
FIG. 4A

LIVENESS AND SPOOF DETECTION FOR ULTRASONIC FINGERPRINT SENSORS

CROSS-REFERENCE TO RELATED APPLICATIONS

This application claims benefit of U.S. provisional application No. 62/295,490, "Liveness Detection" filed Feb. 15, 2016. The aforementioned United States application is hereby incorporated by reference in its entirety.

FIELD

The present disclosure relates to the field of image processing. In particular, the present disclosure relates to apparatuses and methods for detecting a spoof finger.

BACKGROUND

Fingerprint sensing and matching is a commonly used technique for personal identification or verification. For example, one approach to fingerprint identification involves scanning a sample fingerprint or an image with a biometric reader/sensor and storing the image and/or unique characteristics of the fingerprint image. The characteristics of a sample fingerprint may then be compared to information for reference fingerprints already in a database to determine proper identification of a person, such as for verification purposes.

Biometric sensors, particularly fingerprint biometric sensors, are generally prone to being defeated by various forms of spoof samples. In the case of fingerprint readers, a variety of techniques are known for presenting readers with a fingerprint pattern of an authorized user that is embedded in some kind of inanimate material such as paper, gelatin, epoxy, latex, or the like. Thus, even if a fingerprint reader can be considered to reliably determine the presence or absence of a matching fingerprint pattern, it is also critical to the overall system security to ensure that the matching pattern is being acquired from a genuine, living finger, which may be difficult to ascertain with many common sensors.

There are various conventional solutions available in distinguish spoof samples from a live finger. One approach is described in U.S. Pat. No. 7,433,729 B2, where a technique of spoof detection is disclosed using infrared sensors. Another approach is described in PCT1US2015/017557, where a technique of spoof detection is disclosed using optical wavelengths to capture characteristics of skin samples being analyzed. As ultrasonic sensors have become increasingly popular in mobile devices, it is desirable to have apparatuses and methods for liveness and spoof detection with ultrasonic fingerprint sensors.

SUMMARY

Embodiments of apparatuses and methods for detecting a spoof finger are disclosed. In one embodiment, a method of detecting a spoof finger by an ultrasonic fingerprint sensor comprises transmitting an ultrasonic wave to a finger, receiving a reflected ultrasonic wave from the finger, determining a reflected acoustic energy of the finger based on a difference between average amplitudes of the reflected ultrasonic wave from ridges and valleys of the finger, and determining whether the finger is a spoof based at least in part on the reflected acoustic energy of the finger.

According to aspects of the present disclosure, the method of determining the reflected acoustic energy of the finger comprises estimating a background energy received by the ultrasonic sensor array without the finger, and removing the background energy from the reflected acoustic energy of the finger. The method of determining the reflected acoustic energy of the finger further comprises detecting diffractions of the reflected ultrasonic wave, and calculating an image with reduced effects of the diffractions of the reflected ultrasonic wave. The method of determining the reflected acoustic energy of the finger further comprises detecting a non-uniform spatial response in the reflected ultrasonic wave, and adjusting the reflected acoustic energy of the finger to equalize effects of the non-uniform spatial response in the reflected ultrasonic wave. The method of determining the reflected acoustic energy of the finger further comprises identifying regions representing ridges and valleys of the finger, and determining the reflected acoustic energy of the finger based on the difference between average amplitudes of the reflected ultrasonic wave from the regions representing the ridges and the valleys of the finger. The method of determining the reflected acoustic energy of the finger further comprises recording a number of early cycles of the ultrasonic wave received at the ultrasonic sensor array, and adjusting the reflected acoustic energy of the finger based on the number of early cycles of the ultrasonic wave received at the ultrasonic sensor array.

According to aspects of the present disclosure, the method of determining whether the finger is a spoof comprises comparing the reflected acoustic energy of the finger to a threshold range, and determining whether the finger is a spoof based at least in part on whether the reflected acoustic energy of the finger falls within the threshold range. The method of determining whether the finger is a spoof further comprises determining variations of the reflected acoustic energy of the finger over time, and determining whether the finger is a spoof based at least in part on the variations of the reflected acoustic energy of the finger over time. The method of determining whether the finger is a spoof further comprises comparing the variations of the reflected acoustic energy of the finger over time to variations of the reflected acoustic energy of an authorized user's finger collected during enrollment, and determining whether the finger is a spoof based at least in part on a result of the comparison. The method of determining whether the finger is a spoof further comprises detecting a change in temperature of the finger, and determining whether the finger is a spoof based at least in part on the change in temperature of the finger.

In another embodiment, an ultrasonic fingerprint sensor comprises an ultrasonic transmitter configured to transmit an ultrasonic wave to a finger, an ultrasonic sensor array configured to receive a reflected ultrasonic wave from the finger, and a controller configured to determine a reflected acoustic energy of the finger based on a difference between average amplitudes of the reflected ultrasonic wave from ridges and valleys of the finger; and determine whether the finger is a spoof based at least in part on the reflected acoustic energy of the finger.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

FIG. 2A illustrates an exemplary implementation of performing background estimation and removing background noise according to aspects of the present disclosure.

FIG. 2B illustrates another exemplary implementation of performing background estimation according to aspects of the present disclosure.

FIGS. 3A-3D illustrate a method of correcting effects of diffraction in a platen layer of an ultrasonic sensor according to aspects of the present disclosure.

FIG. 4A illustrates an exemplary implementation of equalizing effects of non-uniform spatial response in a reflected ultrasonic wave according to aspects of the present disclosure; FIG. 4B illustrates exemplary images and waveform of the reflected ultrasonic wave of FIG. 4A.

DESCRIPTION OF EMBODIMENTS

Figure 1A:
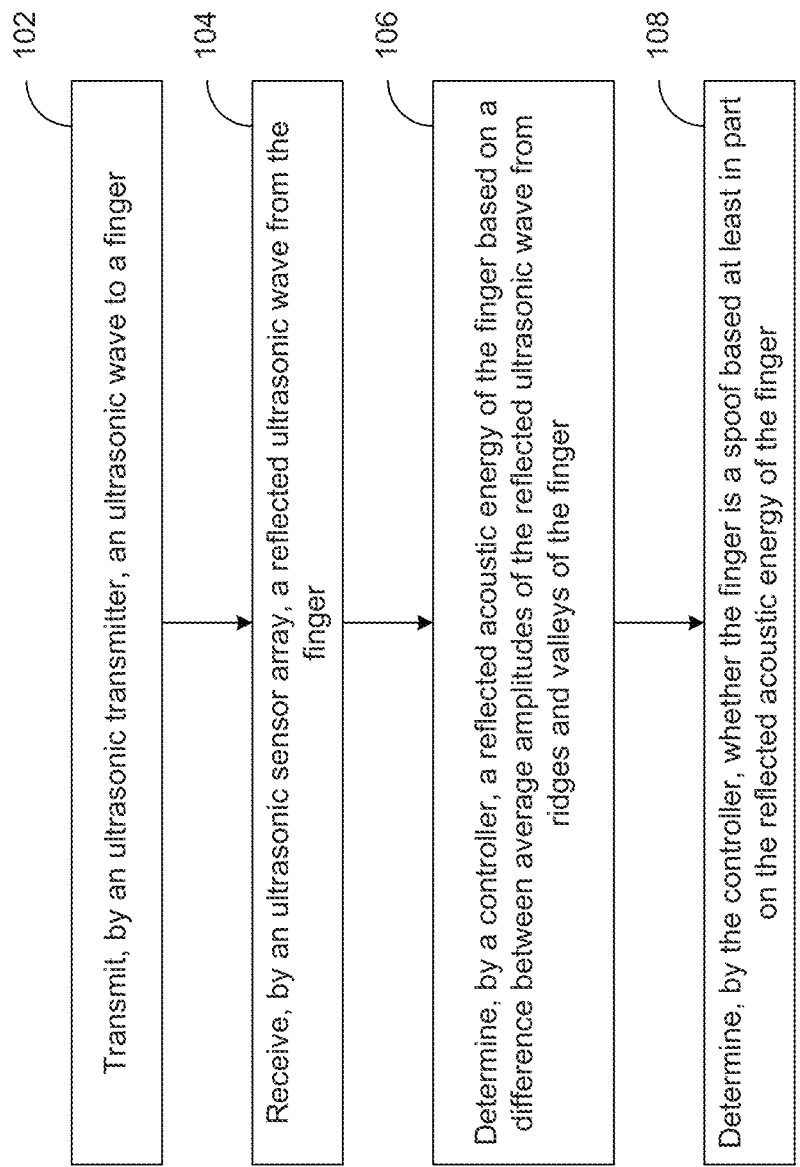
FIG. 1A illustrates an exemplary flow diagram of liveness and spoof detection using an ultrasonic fingerprint sensor according to aspects of the present disclosure.

Embodiments of apparatuses and methods for detecting a spoof finger are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

According to aspects of the present disclosure, an ultrasonic fingerprint sensor may be configured to detect a reflected acoustic energy of a finger. The ultrasonic fingerprint sensor may compute the reflected acoustic energy of the finger and determines whether the reflected acoustic energy resembles a live finger. The reflected acoustic energy may be proportional to the amplitude of the reflected ultrasonic wave from the interface of the sensor to the material placed on it. The computed reflected acoustic energy may be either higher or lower than the reflected acoustic energy of a live finger, and may be classified as a spoof if the reflected acoustic energy is outside a threshold range of a live finger.

According to aspects of the present disclosure, the ultrasonic fingerprint sensor may be configured to perform reflected acoustic energy criterion generation. In some embodiments, when thick platens are used, the imaging of the acoustic load may have band-selective properties. In such situations, not all spatial frequencies can be imaged with a single delay of the image capturing. To account for all the spatial frequencies, images with several delays may be combined. In some embodiments, the output image pixels may be classified to ridges and valleys. The classification may be based on pre-determined thresholds that classify high value pixels and low value pixels. Images of valleys may be classified with values substantially the same as images of air. The average amplitude of valleys may be subtracted from the average amplitude of ridges to generate amplitude metric, which may be used to determine the reflected acoustic energy.

According to aspects of the present disclosure, fake fingers (also referred to as spoofs for conciseness) and real fingers (also referred to as live fingers or fingers) have valleys that may have similar reflection factor as air. Spoofs and fingers can have different reflected acoustic energy. Therefore, estimation of the reflected acoustic energy can be used to differentiate between spoofs and fingers.

According to aspects of the present disclosure, the method of differentiating spoofs from real fingers may comprise fingerprint image processing, liveness detection, and/or calibration on target device. The image processing may include, but not limited to, image enhancement, calculating part of the calibration parameters, and/or feature extraction. The liveness detection can be a real time process, which may include, but not limited to, decision based on threshold per device (sensor) using the features extracted in the image processing step, and/or decision based on data collected during enrollment. The calibration on target device may be based on device power (amplitude), features of the diagonals-target, and/or feature from enrollment.

FIG. 1A illustrates an exemplary flow diagram of liveness and spoof detection using an ultrasonic fingerprint sensor according to aspects of the present disclosure. As shown in FIG. 1A, in block 102, an ultrasonic transmitter of the ultrasonic fingerprint sensor may be configured to transmit an ultrasonic wave to a finger touching a platen of the ultrasonic fingerprint sensor. In block 104, an ultrasonic sensor array of the ultrasonic fingerprint sensor may be configured to receive a reflected ultrasonic wave from the finger. In block 106, a controller of the ultrasonic fingerprint sensor may be configured to determine a reflected acoustic energy of the finger based on a difference between average amplitudes of the reflected ultrasonic wave from ridges and valleys of the finger. In block 108, the controller may be further configured to determine whether the finger is a spoof based at least in part on the reflected acoustic energy of the finger.

Figure 1B:
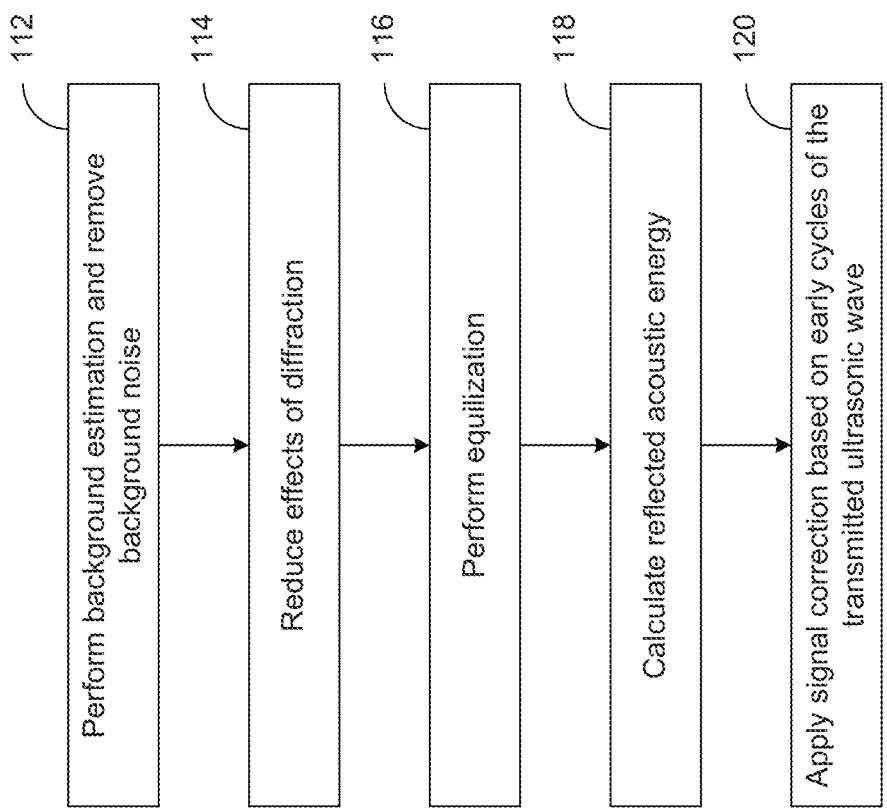
FIG. 1B illustrates an exemplary implementation of determining a reflected acoustic energy of the finger according to aspects of the present disclosure.

FIG. 1B illustrates an exemplary implementation of determining a reflected acoustic energy of the finger according to aspects of the present disclosure. The exemplary implementation shown in FIG. 1B may be controlled by the controller of the ultrasonic fingerprint sensor as described in FIG. 1A. In block 112, the controller may be configured to perform background estimation and remove background noise of the ultrasonic fingerprint sensor. In block 114, the controller may be configured to reduce effects of diffraction of the reflected ultrasonic wave caused by the platen of the ultrasonic fingerprint sensor. In block 116, the controller may be configured to equalize effects of non-uniform spatial response due to the different spatial frequencies between ridges and valleys of different fingerprints. In block 118, the controller may be configured to calculate a reflected acoustic energy of the finger based at least in part on reflected ultrasonic wave, which includes the spatial frequencies between ridges and valleys of the finger. In block 120, the controller may be configured to apply a signal correct to the reflected acoustic energy based on early cycles of the transmitted ultrasonic wave received directly at the ultrasonic sensor array, without substantially any effects of reflections and diffractions. In some embodiments, it may be optional to implement each of the blocks 112, 114, 116, or 120. In other words, some embodiments may not implement any of the blocks 112, 114, 116, or 120, while other embodiments may implement one or more of the blocks 112, 114, 116, 120, or some combinations thereof.

FIG. 2A illustrates an exemplary implementation of performing background estimation and removing background noise according to aspects of the present disclosure. In the example of FIG. 2A, in block 202, the controller of the ultrasonic fingerprint sensor may be configured to estimate a background energy received by the ultrasonic sensor array without the finger being present on the platen. In block 204, the controller may be configured to remove the estimated background energy from the reflected acoustic energy of the finger.

FIG. 2B illustrates another exemplary implementation of performing background estimation according to aspects of the present disclosure. In block 212, the controller of the ultrasonic fingerprint sensor may be configured to determine an acquisition time delay (also referred to as range gate delay) and an ultrasonic transmitter frequency in accordance with a variation of a current temperature from a reference temperature from which an initial background estimation and an initial ultrasonic transmitter frequency are determined. In block 214, the ultrasonic sensor array of the ultrasonic fingerprint sensor may be configured to acquire background image information based on the acquisition time delay and the ultrasonic transmitter frequency. In block 216, the controller of the ultrasonic fingerprint sensor may be configured to compute the background estimate using the background image information.

According to aspects of the present disclosure, background estimation may be determined as follows:

$$Im_{fg} = Im_{fg\_on} - Im_{fg\_off}$$
$$Im_{bg} = Im_{bg\_on} - Im_{bg\_off}$$

Where $Im_{fg\_on}$ is the image captured with a finger or spoof on the platen of the ultrasonic fingerprint sensor with the ultrasonic signal being activated; $Im_{fg\_off}$ is the image captured with a finger or spoof on the platen of the ultrasonic fingerprint sensor with the ultrasonic signal being disabled. $Im_{bg\_on}$ is the image captured without any object on the platen of the ultrasonic fingerprint sensor with the ultrasonic signal being activated, $Im_{bg\_off}$ is the image captured without any object on the platen of the ultrasonic fingerprint sensor with the ultrasonic signal being disabled.

In one embodiment, an estimate of the background image may be obtained by subtracting the background image $Im_{bg}$ from the foreground image $Im_{fg}$. In another embodiment, an estimation of the background image may be obtained by projecting the foreground image on an orthogonal basis that spreads the space of recorded background images. This estimation is then subtracted from $Im_{fg}$ to produce the fingerprint image.

According to aspects of the present disclosure, received reflected ultrasonic wave can be further processed by a diffraction mitigation processing engine. This diffraction mitigation processing engine (also referred to as point spread function) de-blurs and corrects the diffraction artifacts.

FIG. 3A illustrates a method of correcting effects of diffraction in a platen layer of an ultrasonic sensor according to aspects of the present disclosure. As shown in FIG. 3A, in block 302, the method captures a plurality of images of a fingerprint having a plurality of phases in a time sequence. In block 304, the method sums the plurality of images multiplied by a complex phase exponential to form an integrated complex image. With this approach, the time dependent part of the impulse response $\cos(2\pi ft)$ can be removed.

In one embodiment, to remove the time dependent part, $I1(x,y)$ may be computed as follows:

$$I_1(x,y) = \int I(x,y,t)e^{-2\pi ift} dt$$

where the integration is performed over values of t in the range of $I(x,y,t)$, to obtain:

$$I_1(x, y) = \left( \int \cos(2\pi ft - 2\pi fr/c + \varphi)e^{-2\pi ift} dt \right) * f(x, y) + n_1(x, y)$$
$$= const \cdot (\exp(-2\pi ifr/c + i\varphi) + O(f^{-1})) * f(x, y) + n_1(x, y)$$

Note that if the integration is over all time, then the value of $(f^{-1})$ term may be small and negligible. In addition, the signal to noise ratio (SNR) of $I_1(x,y)$ can be higher than that of $I(x,y,t)$ for a single t by a factor of $\Delta t$, the range of integration.

Note that $I_1(x,y)$ is a complex image. The real part of $I_1(x,y)$ and the imaginary parts of $I_1(x,y)$ can complement each other: where the real part of $I_1(x,y)$ has clouds, the imaginary part of $I_1(x,y)$ does not, or vice versa. These characteristics are shown in FIG. 3B. FIG. 3B illustrates an exemplary input complex image 312, a real part 314 of the input complex image, and an imaginary part 316 of the input complex image, according to aspects of the present disclosure. Note that in FIG. 3B, the real part of I1(x,y) has the same phase as the input image, while the imaginary part of I1(x,y) may be 90° out of phase and complements the real part of I1(x,y). Also note that the signal to noise ratio (SNR) of the images has improved. Since the real and imaginary parts complement each other, the complex image has no clouds, even though the real and imaginary parts do have clouds.

The reflected ultrasonic wave comprises a plurality of images of the finger having a plurality of phases in the time sequence. The plurality of images of a fingerprint may be combined. In some implementations, a processor or processing logic, as a part of the controller of the ultrasonic fingerprint sensor, may be configured to integrate the plurality of images multiplied by the complex phase exponential over time to generate the integrated complex image. Note that the integrated complex image includes a real image part and an imaginary image part, and where the real image part and the imaginary image part may have approximately 90 degrees offset in phase.

In some embodiments, an integrated complex image may be aligned to a pre-selected phase. For example, a processor or processing logic may be configured to convolve the integrated complex image with a complex kernel, where the complex kernel is an inverse of a spatial part of an impulse response. In some embodiments, the processor or processing logic may be optionally/additionally configured to separate spatial components from phase components of the integrated complex image using other approaches. In addition, the processor or processing logic may be configured to remove edge effects by performing the convolution using Discrete Cosine Transform (DCT). In some embodiments, the processor or processing logic may be optionally/additionally configured to remove edge effect by using a duplicate of the integrated complex image along an edge of the integrated complex image.

In some embodiments, a maximum energy image may be determined to represent a fingerprint according to aspects of the present disclosure. For example, the processor or processing logic may be configured to compute a derivative of energy of the aligned complex image with respect to phase. Moreover, the processor or processing logic may be configured to compute the maximum energy phase by setting the derivative of the energy of the aligned complex image with respect to phase to zero. Furthermore, the processor or processing logic may be configured to assign a real component of the aligned complex image at the maximum energy phase to be the maximum energy image.

Figure 3D:
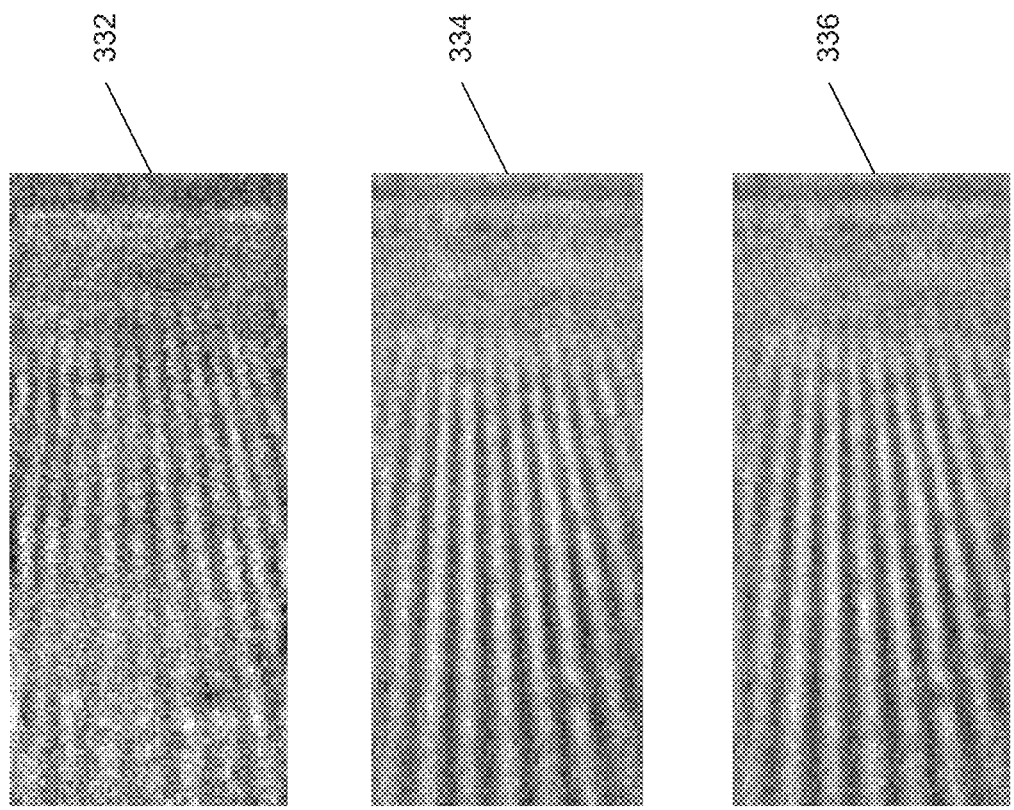
Figure 3C:
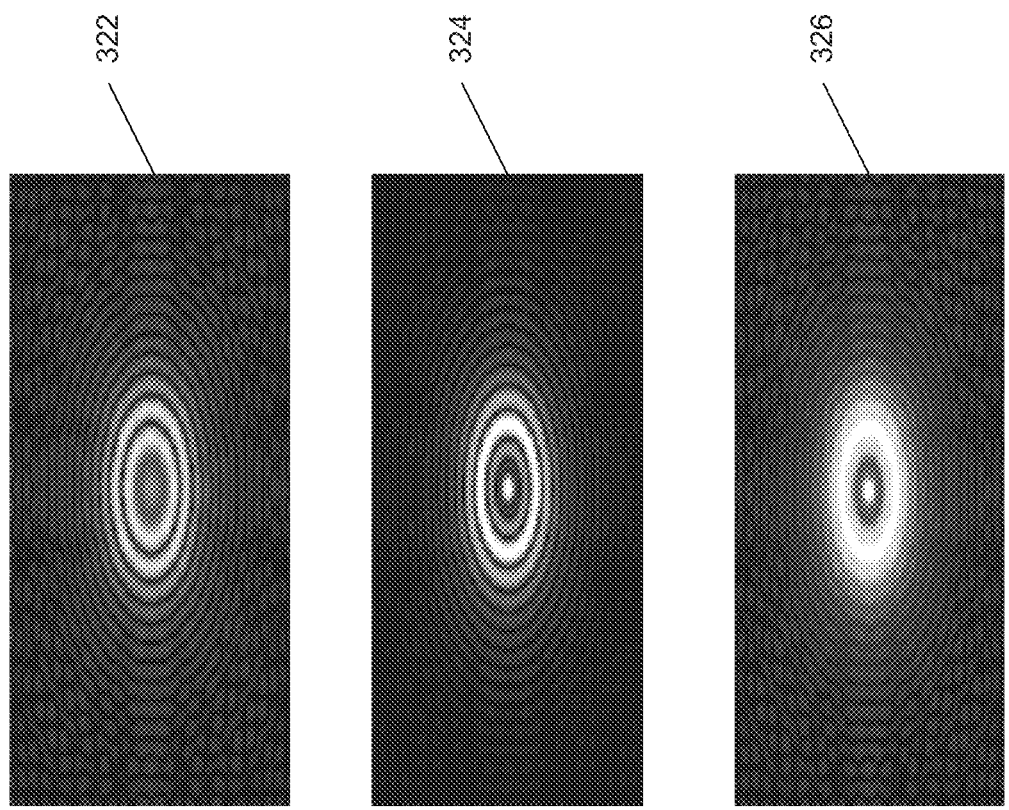

Referring to FIG. 3C, in the frequency domain, $\cos(-2\pi fr/c+\varphi)$ and $\sin(-2\pi fr/c+\varphi)$ may be represented as 322 and 324, respectively. In this example, numeral 322 represents a real part of an estimated frequency response of a simulated diffraction; numeral 324 represents an imaginary part of estimated frequency response of a simulated diffraction according to aspects of the present disclosure.

Numeral 326 represents a sum of 322 and 324 according to aspects of the present disclosure. As shown in FIG. 3C, the black rings in the spectrum of the real and imaginary parts correspond to the position of the clouds, while the spectrum of the complex exponential is much smoother. In addition, the position of the black rings changes when $\varphi$ is changed, while the spectrum of the exponential may be the same, only the phase changes. Another advantage of the complex exponent is that it allows the spatial term to be separated from the overall phase term.

Referring back to FIG. 3A, in block 306, the method aligns the integrated complex image to a pre-selected phase to form an aligned complex image. Note that, in some embodiments, the pre-selected phase may be a matrix of phases (an image). With this approach, the spatial part of the impulse response $-2\pi fr/c$ can be removed. In the model shown above, the output from the first step, $I1(x,y)$, may be approximately equal to (up to a constant and some additive noise):

$$I_1(x,y)=e^{i\varphi}h_1*f(x,y)$$

$$h_1=\exp(-2\pi ifr/c)$$

Since h1 is known, I1(x,y) can be convolved with its inverse:

$$h1^{-1}=\mathcal{F}^{-1}(1/\mathcal{F}h1)$$

However, since the spectrum of h1 can be close to zero at some points, the following operation may be performed:

$$h2=\mathcal{F}^{-1}((\mathcal{F}h1)*/|\mathcal{F}h1|)$$

$$I2(x,y)=h2*/1=e^{i\varphi}\mathcal{F}^{-1}(|\mathcal{F}h1|)*f(x,y)$$

The middle term is a band-pass filter without phase distortions.

In order to avoid edge effects during the convolution with $h_2$, in one exemplary approach, the convolution may be performed with an image twice the size of the original image by mirror reflecting along each edge and taking the middle part at the end. FIG. 3D illustrates an exemplary real part 502 of an aligned complex image and an imaginary part 504 of the aligned complex image according to aspects of the present disclosure.

Referring back to FIG. 3A, in block 308, the method determines a maximum energy phase using the aligned complex image. In block 310, the method computes a maximum energy image to represent the fingerprint based at least in part on the aligned complex image at the maximum energy phase. With this approach, the overall phase $\varphi$ can be removed. In the examples shown in FIG. 3D, the imaginary part 334 of the aligned complex image has better image quality than the real part 332 of the aligned complex image, and note that both the imaginary part 332 and the real part 334 of the aligned complex image do not have phase inversions. The reason is that $\varphi \approx \pm \pi/2$ in this case. To find the optimal phase in the general case, the phase that gives maximum energy to the real part can be computed as:

$$\varphi 0 = arg\ \varphi max\{\int [Re(e^{i\varphi}I2(x,y))]^2 dxdy\}\text{ and then set}$$

$$I3(x,y)=Re(e^{i\varphi 0}I2(x,y))$$

In this optimization method, the expression can be differentiated with respect to $\varphi$, $$Se^{2i\varphi}+S*e^{-2i\varphi}$$

with $$S=\int I2(x,y)^2 dxdy$$

Note that S is a complex number, not the total energy. Equating to 0 gives:

$$e^{i\varphi 0}=\sqrt{(\pm|S|/S)}$$

The positive sign is chosen because the negative sign gives a minimum. In one embodiment, I3 may be computed as:

$$I3=(I2/\sqrt{S})$$

Note that S has two square roots differing only by a sign. To fix the overall sign, the correlation coefficient of I3 with one of the input images can be computed. In some implementations, if I3 turns out to be negative, then it may be set as: I3=−I3. An exemplary maximum energy image is shown with numeral 336.

According to aspects of the present disclosure, parameters for the speed of sound c and rmax may be chosen. Other parameters may be set to their known values. In some embodiments, both c and rmax may be obtained by choosing the parameters that produces the highest quality output images. In some implementations, for a glass layer, the values of c and rmax may be chosen as: c=3700 m/s, rmax=1.33. For a plastic layer, the values of c and rmax may be chosen as: c=2000 m/s, rmax=1.33. Note that the method described herein can work even if the values of the parameters may not be exact. For example, if c is changed by ~±20%, reasonably good images may still be obtained.

In some implementations, the diffraction mitigation processing engine can be modified by: 1) remove phase optimization; 2) remove the match statistic feature; and/or 3) optionally remove the histogram equalization feature, where the diffraction mitigation processing may be applied as follows:

$$I_{clean} = psf\_combine(Im)$$

According to aspects of the present disclosure, to estimate the amplitude of the live/spoof fingerprint, several features from the enhanced image $I_{clean}$ may be estimated based on their sorted data as follows.

a) Max value: extract the mean over the trim values of valleys of $I_{clean}$.

Max value=mean(trim(valleys)).

b) Min value: extract the mean over the trim values of ridges of $I_{clean}$

Min value=mean(trim(ridges)).

c) The amplitude:

Amp=(Max value−Min value).

Trim values may be determined according to two thresholds L1 & L2 that set the range of the trim data.

If x(1:N) is the sorted column vector of $I_{clean}$ then:

Max_Value=mean(x(L1:L2))

Let y=f lipud(x)

Min_Value=mean(y(L1:L2))

The reflected acoustic energy may be estimated as:

Amp_Value=Max_Value−Min_Value

Note that the amplitude may be independent of image inversions.

FIG. 4A illustrates an exemplary implementation of equalizing effects of non-uniform spatial response in a reflected ultrasonic wave according to aspects of the present disclosure. In the example of FIG. 4A, in block 402, the controller of the ultrasonic fingerprint sensor may be configured to detect a non-uniform spatial response in the reflected ultrasonic wave. In block 404, the controller may be configured to adjust the reflected acoustic energy of the finger to equalize effects of the non-uniform spatial response in the reflected ultrasonic wave.

FIG. 4B illustrates exemplary images and waveform of the reflected ultrasonic wave of FIG. 4A. As shown in FIG. 4B, numeral 414 represents an exemplary image prior to equalization adjustment, and numeral 412 represents a corresponding waveform of the exemplary image of 414. Numeral 416 represents an exemplary image after the equalization adjustment.

The ultrasonic fingerprint sensor may have non-uniform lines per millimeter (LPMM) range response. This may cause objects of the same materials and different LPMMs to show different reflected acoustic energy scores. To address this situation, in some implementations, an equalization mask may be generated during factory calibration. An object with a wide spectral range may be used for mask generation, and the reflected ultrasonic image may be scaled by the mask, to provide the same energy weight to all frequencies received.

Figure 5B:
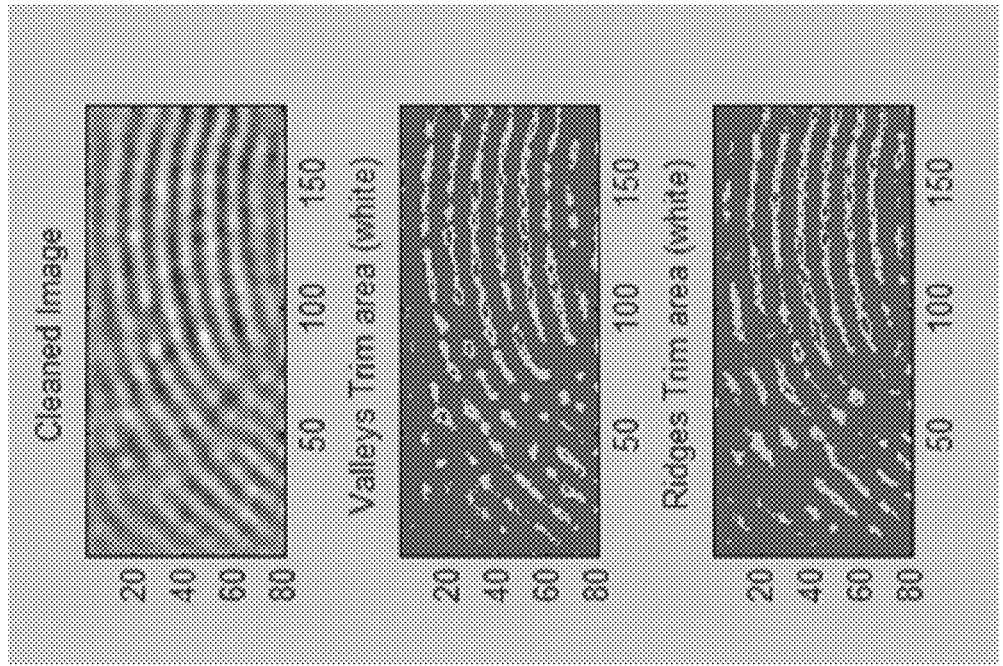
FIGS. 5A-5B illustrate an exemplary implementation of determining the reflected acoustic energy of a finger according to aspects of the present disclosure.
Figure 5A:
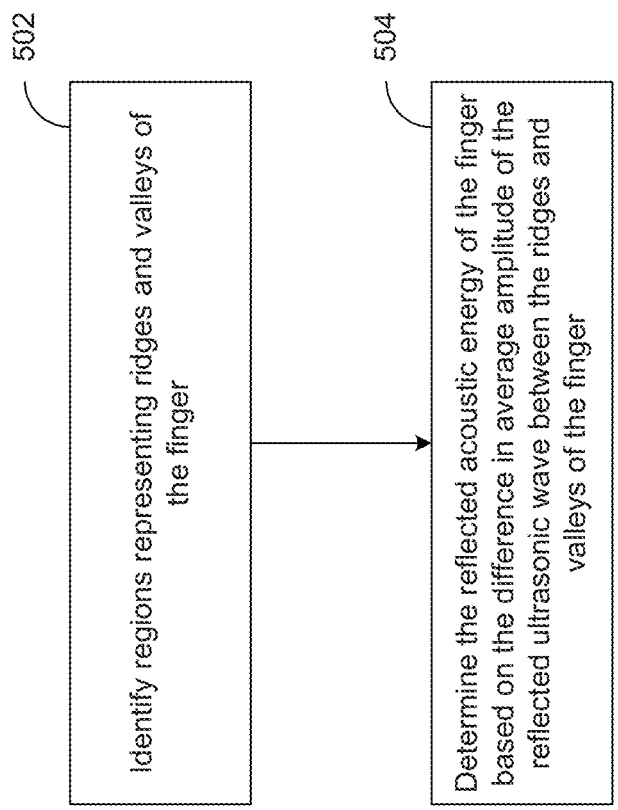

FIG. 5A illustrates an exemplary implementation of determining the reflected acoustic energy of a finger according to aspects of the present disclosure. As shown in FIG. 5A, in block 502, the controller of the ultrasonic fingerprint sensor may be configured to identify regions representing ridges and valleys of the finger. In block 504, the controller may be configured to determine the reflected acoustic energy of the finger based on the difference between average amplitudes of the reflected ultrasonic wave from the regions representing the ridges and the valleys of the finger.

In some embodiments, the controller of the ultrasonic fingerprint sensor may be configured to collect different images of the finger with corresponding different time delays (also referred to as range gate delays) and create a combined image of the finger using the different images of the finger. The controller may be further configured to identify regions representing ridges and valleys of the finger using the combined image of the finger, determining spatial frequencies between ridges and valleys of the finger, and determine the reflected acoustic energy of the finger based at least in part on the spatial frequencies between ridges and valleys of the finger. FIG. 5B illustrates a masking plot for valleys and ridges according to aspects of the present disclosure.

Figures 5C, 5D:
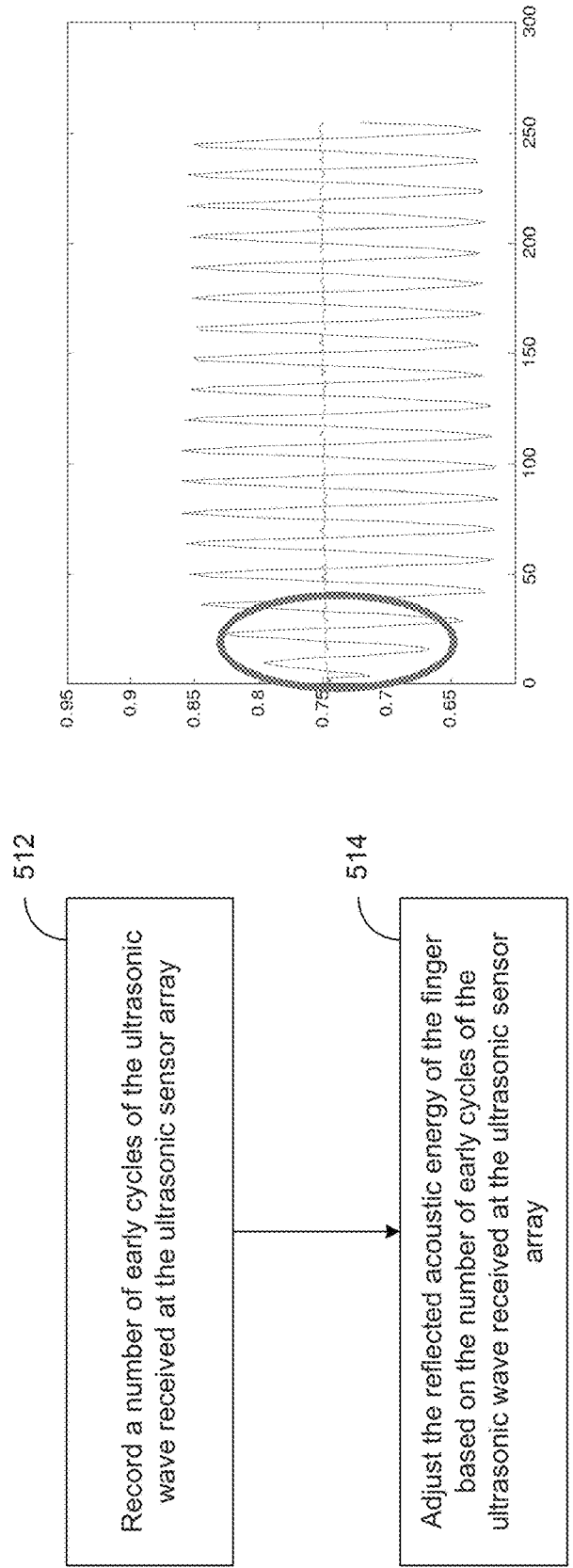
FIGS. 5C-5D illustrates an exemplary implementation for adjusting the reflected acoustic energy according to aspects of the present disclosure.

FIG. 5C illustrates an exemplary implementation for adjusting the reflected acoustic energy according to aspects of the present disclosure. In the example shown in FIG. 5C, in block 512, an ultrasonic sensor array of the ultrasonic fingerprint sensor may be configured to record a number of early cycles of the ultrasonic wave transmitted by the ultrasonic transmitter and received at the ultrasonic sensor array. According to aspects of the present disclosure, the early cycles of the ultrasonic wave represent direct path ultrasonic waves transmitted directly from the transmitter to the ultrasonic sensor array, without the interference of reflections and refractions. In block 514, the controller of the ultrasonic fingerprint sensor may be configured to adjust the reflected acoustic energy of the finger based on the number of early cycles of the ultrasonic wave received at the ultrasonic sensor array. FIG. 5D illustrates an example of the number of early cycles of the ultrasonic wave, which are highlighted by the oval.

Figures 6A, 6B:
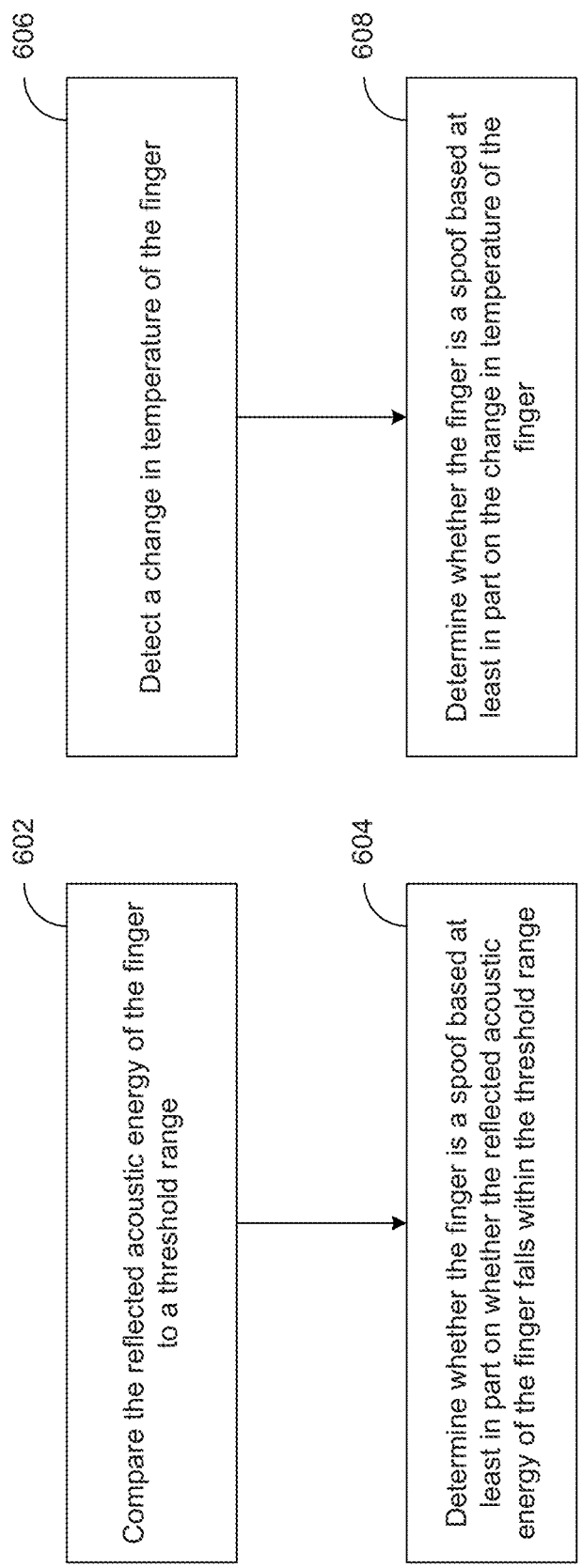
FIG. 6A illustrates an exemplary implementation of determining whether a finger is a spoof according to aspects of the present disclosure.
FIG. 6B illustrates another exemplary implementation of determining whether a finger is a spoof according to aspects of the present disclosure.

FIG. 6A illustrates an exemplary implementation of determining whether a finger is a spoof according to aspects of the present disclosure. In block 602, a controller of the ultrasonic fingerprint sensor may be configured to compare a reflected acoustic energy of the finger to a threshold range. In block 604, the controller may be configured to determine whether the finger is a spoof based at least in part on whether the reflected acoustic energy of the finger falls within the threshold range.

In some embodiments, liveness decision may be performed in real time. Decisions may be made based on thresholds per sensor device using the features extracted as described above, or use calibration parameters obtained during enrollment process. Note that the reflected acoustic energy of a live finger in steady state may be higher than the reflected acoustic energy of a spoof. In addition, the reflected acoustic energy of a live finger may reach its steady state levels sooner, if its time derivative is high. On the other hand, this may not be the case for spoofs that have low reflected acoustic energy derivative.

In some embodiments, reflected acoustic energy can be calculated as a function of time. At each time point the reflected acoustic energy can be calculated over the cleaned image (with removal of background image and correction of diffraction effects) and compared against two thresholds (between a low threshold and a high threshold).

```
If ( ImpAmp > HIGH_THR )
    Decision = Finger; reliability = HIGH (90%);
    Close and Return from liveness
else if ( ImpAmp < LOW_THR )
    Decision = Spoof; reliability = HIGH (90%);
    Close and Return from liveness
else
    Continue
```

If the current reflected acoustic energy is between the low and high threshold range, the method continues to the next time point.

Upon ImpAmp for all time points have been calculated, the reflected acoustic energy derivative can be calculated as follows:

$$\text{slope} = \frac{\partial(\text{ImpAmp})}{\partial t}.$$

And apply the simple logic:

$$\text{If } \left(\left(\text{avg}\left(\frac{\partial(\text{ImpAmp})}{\partial t}\right) > \text{AVG\_SLOPE\_THR}\right) \text{ II } \left(\max\left(\frac{\partial(\text{ImpAmp})}{\partial t}\right) > \text{SLOPE\_THR}\right)\right)$$

```
Decision = Finger;
Calculate estimated reliability;
else
    Decision = Spoof;
    Calculate estimated reliability;
```

The method may then set the reliability probability (error function) according to the normalized thresholds/factors, measurements, and slope in case of low reflected acoustic energy, which are referred below as the three features. The thresholds may then be set during calibration except the sensor amplitude (transmit power), which may also be calculated in real time.

In some embodiments, several parameters may be measured during the calibration process, which may include but not limited to: 1) calculate the three features for target pattern/s (calibration at the production line); 2) calculate the three features for each of the enrollment images (or take specific user image); and/or 3) calculate sine amplitude (max sample−min sample) using early images.

FIG. 6B illustrates another exemplary implementation of determining whether a finger is a spoof according to aspects of the present disclosure. As shown in FIG. 6B, in block 606, a controller of the ultrasonic fingerprint sensor may be configured to detect a change in temperature of the finger. In block 608, the controller may be configured to determine whether the finger is a spoof based at least in part on the change in temperature of the finger.

Figure 6C:
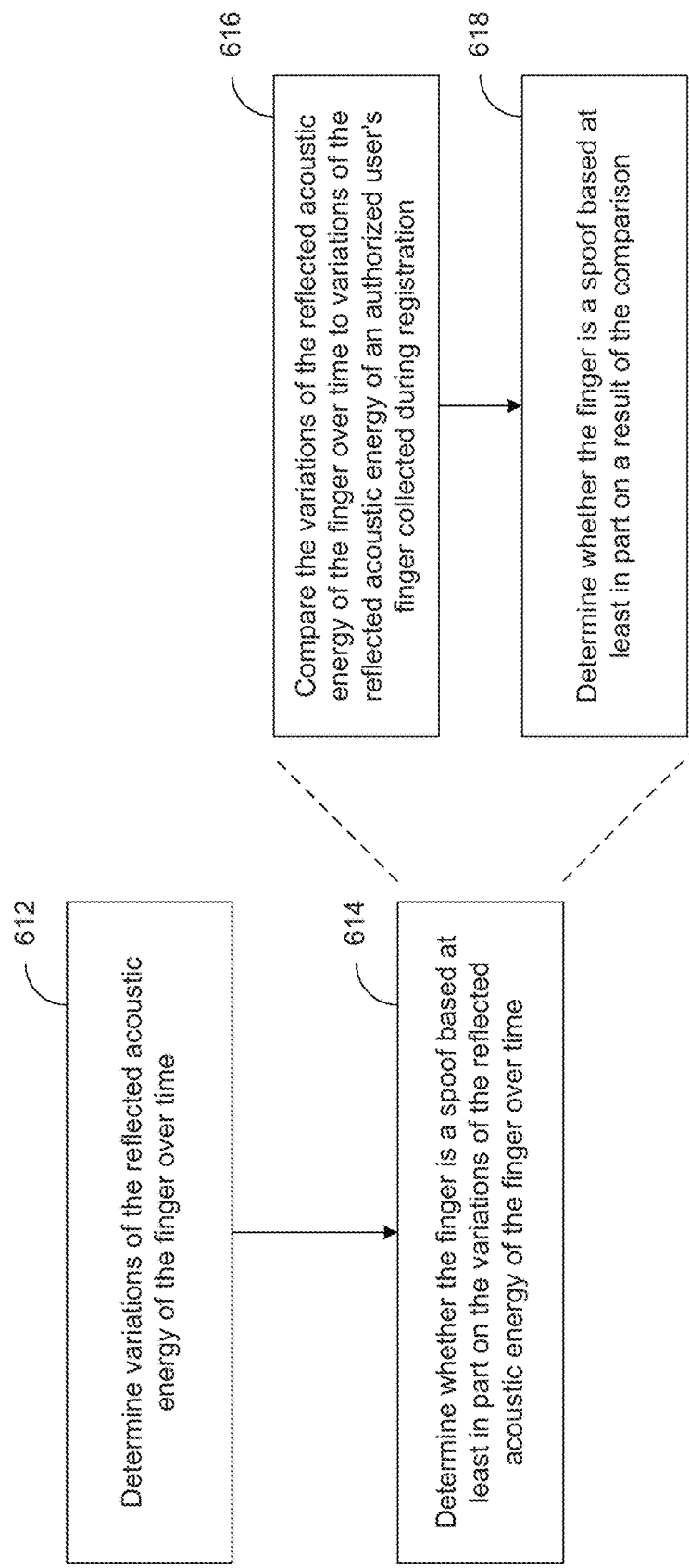
FIG. 6C illustrates yet another exemplary implementation of determining whether a finger is a spoof according to aspects of the present disclosure.

FIG. 6C illustrates yet another exemplary implementation of determining whether a finger is a spoof according to aspects of the present disclosure. In the example shown in FIG. 6C, in block 612, a controller of the ultrasonic fingerprint sensor may be configured to determine variations of the reflected acoustic energy of the finger over time. In block 614, the controller may be configured to determine whether the finger is a spoof based at least in part on the variations of the reflected acoustic energy of the finger over time. According to aspects of the present disclosure, the method performed in block 614 may further include the methods performed in blocks 616 and 618. In block 616, the controller may be configured to compare the variations of the reflected acoustic energy of the finger over time to variations of the reflected acoustic energy of an authorized user's finger collected during enrollment. In block 618, the controller may be configured to determine whether the finger is a spoof based at least in part on a result of the comparison.

In some embodiments, a live finger may have dynamic reflected acoustic energy characteristics, resulting in changing reflected acoustic energy over time. The reflected acoustic energy of the finger is measured multiple times in order to verify a change of the reflected acoustic energy. Spoofs, on the other hand, usually don't exhibit such a trend, thus can be detected.

According to aspects of the present disclosure, the system may be configured to perform early signal calibration. Some of the parameters can be auto calibrated using the signal at an early time, before the fingerprint information arrives to the receiver. This allows calibration for deviations of transmission, reception, strength per pixel. The run-time values are divided by the early-signal amplitude in order to normalize the metric.

According to aspects of the present disclosure, the system may be configured to use subset of the pixels for liveness and calibration. The above methods of the detection may use aggregation of the signal levels and not fingerprint features. This allows using of sub-images that do not contain the full fingerprint image. The partial image analysis has several benefits: a) It requires less time, thus latency is much smaller; b) The power consumption is usually associated with the capturing and analysis time, and fewer pixels being analyzed means less power may be consumed; c) The smaller computational load allows running the algorithm on the fingerprint controller, thus further reducing power, latency, security and complexity. d) It allows self-calibration due to parameter change over temperature.

According to aspects of the present disclosure, the sensing of the temperature of the acoustic load (fingerprint or spoof) can be measured during the matching time. The human body has relatively larger mass than a spoof, and is also temperature regulated. This results in a characteristic heat transfer profile with the fingerprint sensor. For instance, a cold sensor will heat up to a human body temperature, and the same will happen if the sensor is very hot. Spoofs will usually have the same temperature as their ambient environment. Even if they are heated or cooled for a human body temperature, their smaller mass will usually result in slower slope of the temperature.

According to aspects of the present disclosure, during enrollment of a finger, the different thresholds of the algorithm can be refined. For instance, the reflected acoustic energy thresholds can be relaxed or hardened based on the specific finger characteristics. Users that have poor separation from spoofs metric, can be advised not to use the feature, in order not to be rejected as spoof "too many times".

According to aspects of the present disclosure, the level of security can be dynamically adjusted per the use case. For monetary transaction, the users may be more tolerant to false rejection as spoof, and having to try again to match.

Figure 7:
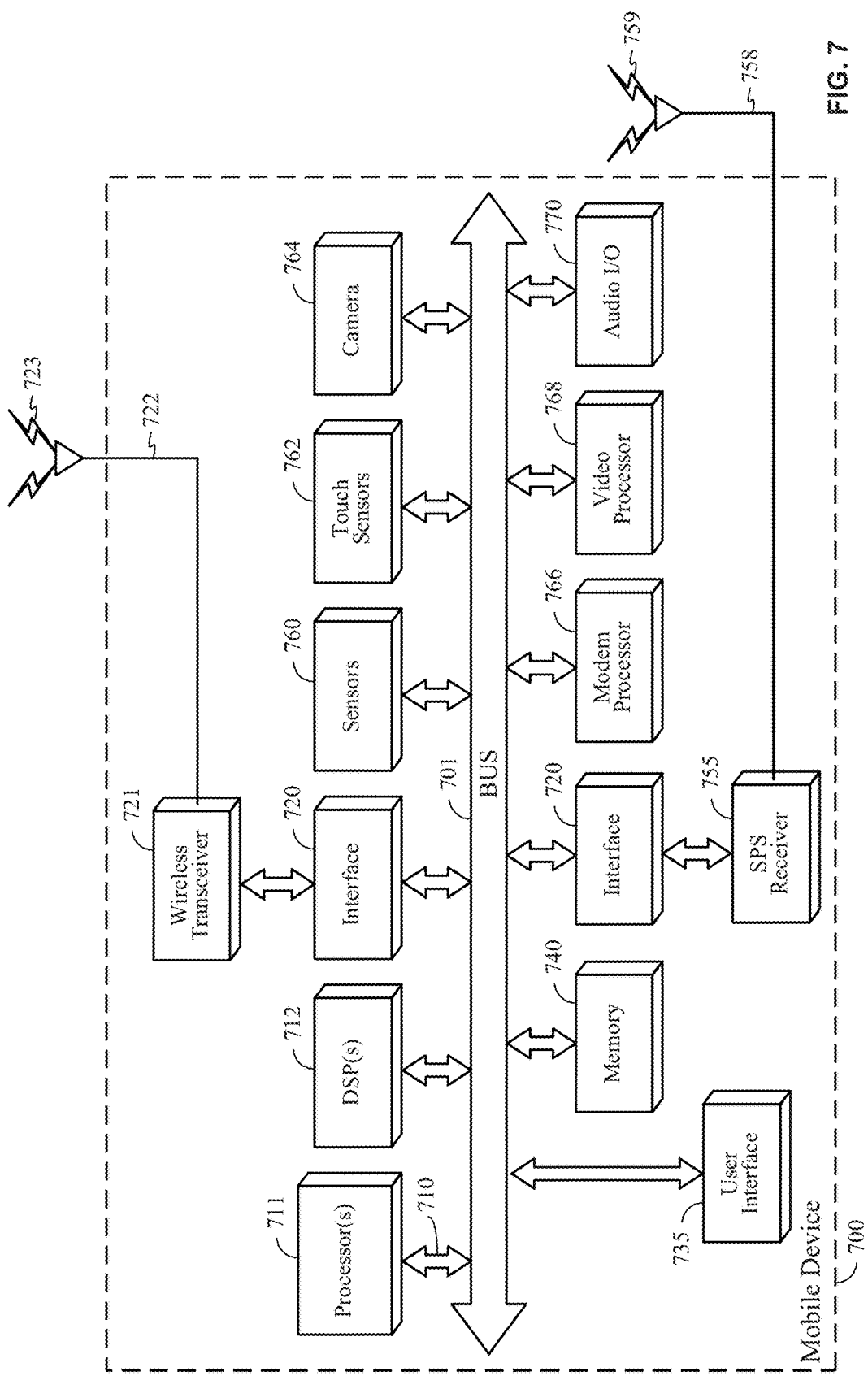
FIG. 7 illustrates an exemplary block diagram of a device that may be configured to detect liveness of a finger according to aspects of the present disclosure.

FIG. 7 illustrates an exemplary block diagram of a device that may include an ultrasonic fingerprint sensor configured to detect liveness of a finger according to aspects of the present disclosure. The device that may be configured to detect liveness of a finger may comprise one or more features of mobile device 700 shown in FIG. 7. In certain embodiments, mobile device 700 may include a wireless transceiver 721 that is capable of transmitting and receiving wireless signals 723 via wireless antenna 722 over a wireless communication network. Wireless transceiver 721 may be connected to bus 701 by a wireless transceiver bus interface 720. Wireless transceiver bus interface 720 may, in some embodiments be at least partially integrated with wireless transceiver 721. Some embodiments may include multiple wireless transceivers 721 and wireless antennas 722 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth®, etc.

Mobile device 700 may also comprise GPS receiver 755 capable of receiving and acquiring GPS signals 759 via GPS antenna 758. GPS receiver 755 may also process, in whole or in part, acquired GPS signals 759 for estimating a location of a mobile device. In some embodiments, processor(s) 711, memory 740, DSP(s) 712 and/or specialized processors (not shown) may also be utilized to process acquired GPS signals, in whole or in part, and/or calculate an estimated location of mobile device 700, in conjunction with GPS receiver 755. Storage of GPS or other signals may be performed in memory 740 or registers (not shown).

Also shown in FIG. 7, mobile device 700 may comprise digital signal processor(s) (DSP(s)) 712 connected to the bus 701 by a bus interface 710, processor(s) 711 connected to the bus 701 by a bus interface 710 and memory 740. Bus interface 710 may be integrated with the DSP(s) 712, processor(s) 711 and memory 740. In various embodiments, functions may be performed in response execution of one or more machine-readable instructions stored in memory 740 such as on a computer-readable storage medium, such as RAM, ROM, FLASH, or disc drive, just to name a few examples. The one or more instructions may be executable by processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions described herein. In a particular implementation, wireless transceiver 721 may communicate with processor(s) 711 and/or DSP(s) 712 through bus 701 to enable mobile device 700 to be configured as a wireless station. Processor(s) 711 and/or DSP(s) 712 may execute instructions to execute one or more aspects of processes/methods discussed in connection with FIGS. 1A-1C through FIGS. 6A-6C. Processor(s) 711 and/or DSP(s) 712 may perform the methods and functions as a part of the controller described in FIGS. 1A-1C through FIGS. 6A-6C.

Also shown in FIG. 7, a user interface 735 may comprise any one of several devices such as, for example, a speaker, microphone, display device, vibration device, keyboard, touch screen, etc. A user interface signal provided to a user may be one or more outputs provided by any of the speaker, microphone, display device, vibration device, keyboard, touch screen, etc. In a particular implementation, user interface 735 may enable a user to interact with one or more applications hosted on mobile device 700. For example, devices of user interface 735 may store analog or digital signals on memory 740 to be further processed by DSP(s) 712 or processor 711 in response to action from a user. Similarly, applications hosted on mobile device 700 may store analog or digital signals on memory 740 to present an output signal to a user. In another implementation, mobile device 700 may optionally include a dedicated audio input/output (I/O) device 770 comprising, for example, a dedicated speaker, microphone, digital to analog circuitry, analog to digital circuitry, amplifiers and/or gain control. In another implementation, mobile device 700 may comprise touch sensors 762 responsive to touching or pressure on a keyboard or touch screen device.

Mobile device 700 may also comprise a dedicated camera device 764 for capturing still or moving imagery. Dedicated camera device 764 may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at processor 711 or DSP(s) 712. Alternatively, a dedicated video processor 768 may perform conditioning, encoding, compression or manipulation of signals representing captured images. Additionally, dedicated video processor 768 may decode/decompress stored image data for presentation on a display device (not shown) on mobile device 700.

Mobile device 700 may also comprise sensors 760 coupled to bus 701 which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, and camera imagers, microphones, just to name few examples. Sensors 760 may generate analog or digital signals that may be stored in memory 740 and processed by DPS(s) or processor 711 in support of one or more applications such as, for example, applications directed to positioning or navigation operations.

In a particular implementation, mobile device 700 may comprise a dedicated modem processor 766 capable of performing baseband processing of signals received and down-converted at wireless transceiver 721 or GPS receiver 755. Similarly, dedicated modem processor 766 may perform baseband processing of signals to be up-converted for transmission by wireless transceiver 721. In alternative implementations, instead of having a dedicated modem processor, baseband processing may be performed by a processor or DSP (e.g., processor 711 or DSP(s) 712).

Figure 8A:
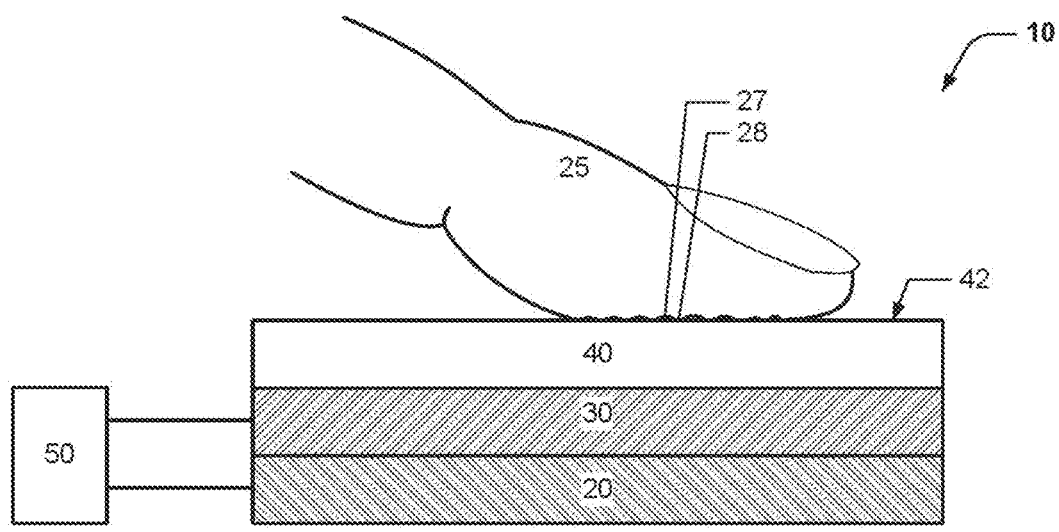
FIGS. 8A-8C illustrate an example of an ultrasonic sensor according to aspects of the present disclosure.
Figure 8B:
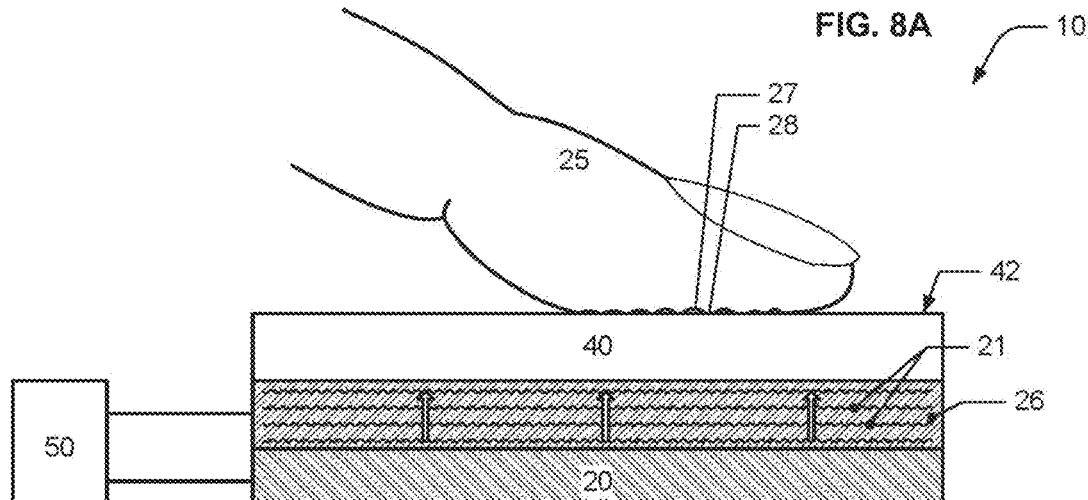
Figure 8C:
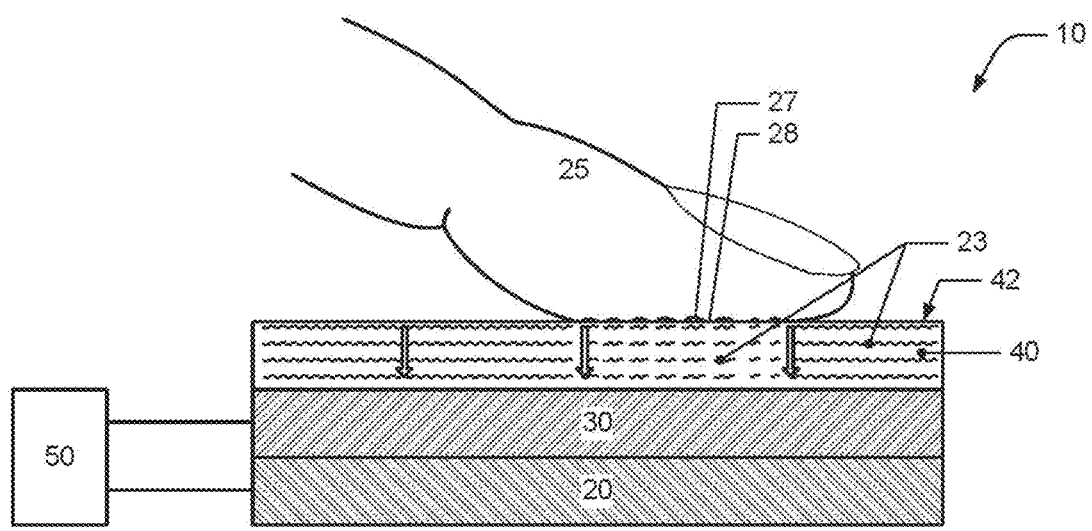

FIGS. 8A-8C illustrate an example of an ultrasonic sensor according to aspects of the present disclosure. As shown in FIG. 8A, ultrasonic sensor 10 may include an ultrasonic transmitter 20 and an ultrasonic receiver 30 under a platen 40. The ultrasonic transmitter 20 may be a piezoelectric transmitter that can generate ultrasonic waves 21 (see FIG. 8B). The ultrasonic receiver 30 may include a piezoelectric material and an array of pixel circuits disposed on a substrate. In operation, the ultrasonic transmitter 20 generates one or more ultrasonic waves that travel through the ultrasonic receiver 30 to the exposed surface 42 of the platen 40. At the exposed surface 42 of the platen 40, the ultrasonic energy may be transmitted, absorbed or scattered by an object 25 that is in contact with the platen 40, such as the skin of a fingerprint ridge 28, or reflected back. In those locations where air contacts the exposed surface 42 of the platen 40, e.g., valleys 27 between fingerprint ridges 28, most of the ultrasonic wave will be reflected back toward the ultrasonic receiver 30 for detection (see FIG. 8C). Control electronics 50 may be coupled to the ultrasonic transmitter 20 and ultrasonic receiver 30 and may supply timing signals that cause the ultrasonic transmitter 20 to generate one or more ultrasonic waves 21. The control electronics 50 may then receive signals from the ultrasonic receiver 30 that are indicative of reflected ultrasonic energy 23. The control electronics 50 may use output signals received from the ultrasonic receiver 30 to construct a digital image of the object 25. In some implementations, the control electronics 50 may also, over time, successively sample the output signals to detect the presence and/or movement of the object 25.

According to aspects of the present disclosure, an ultrasonic sensor may include an ultrasonic transmitter 20 and an ultrasonic receiver 30 under a platen 40. The ultrasonic transmitter 20 may be a plane wave generator including a substantially planar piezoelectric transmitter layer. Ultrasonic waves may be generated by applying a voltage to the piezoelectric layer to expand or contract the layer, depending upon the signal applied, thereby generating a plane wave. The voltage may be applied to the piezoelectric transmitter layer via a first transmitter electrode and a second transmitter electrode. In this fashion, an ultrasonic wave may be made by changing the thickness of the layer via a piezoelectric effect. This ultrasonic wave travels toward a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes may be metallized electrodes, for example, metal layers that coat opposing sides of the piezoelectric transmitter layer.

The ultrasonic receiver 30 may include an array of pixel circuits disposed on a substrate, which also may be referred to as a backplane, and a piezoelectric receiver layer. In some implementations, each pixel circuit may include one or more TFT elements, electrical interconnect traces and, in some implementations, one or more additional circuit elements such as diodes, capacitors, and the like. Each pixel circuit may be configured to convert an electric charge generated in the piezoelectric receiver layer proximate to the pixel circuit into an electrical signal. Each pixel circuit may include a pixel input electrode that electrically couples the piezoelectric receiver layer to the pixel circuit.

Figure 9A:
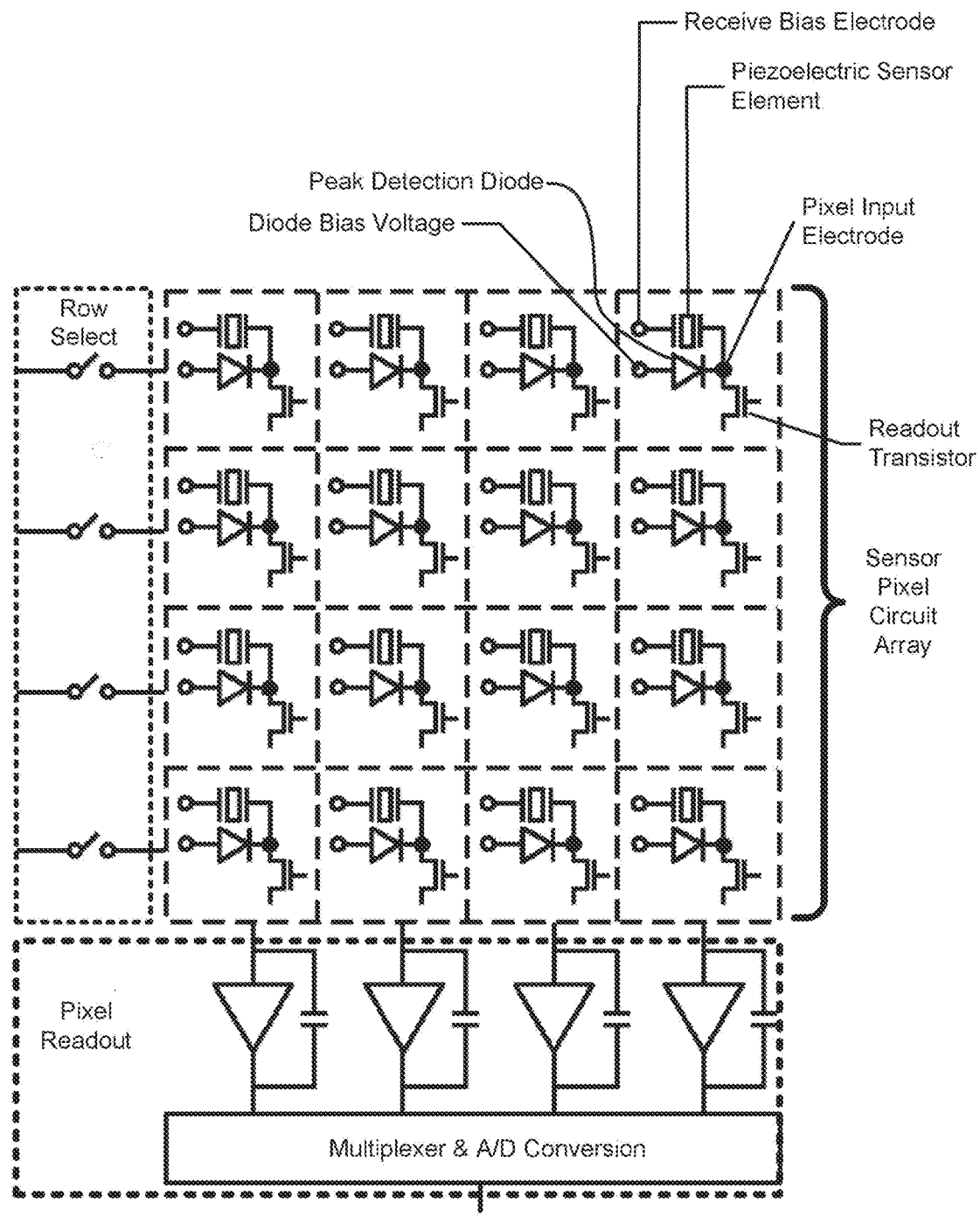
FIG. 9A illustrates an example of a four-by-four array of sensor pixels for an ultrasonic sensor array.

In the illustrated implementation, a receiver bias electrode is disposed on a side of the piezoelectric receiver layer proximal to platen 40. The receiver bias electrode may be a metallized electrode and may be grounded or biased to control which signals are passed to the TFT array. Ultrasonic energy that is reflected from the exposed (top) surface 42 of the platen 40 is converted into localized electrical charges by the piezoelectric receiver layer. These localized charges are collected by the pixel input electrodes and are passed on to the underlying pixel circuits. The charges may be amplified by the pixel circuits and provided to the control electronics, which processes the output signals. A simplified schematic of an example pixel circuit is shown in FIG. 9A, however one of ordinary skill in the art will appreciate that many variations of and modifications to the example pixel circuit shown in the simplified schematic may be contemplated.

Control electronics 50 may be electrically connected to the first transmitter electrode and the second transmitter electrode, as well as to the receiver bias electrode and the pixel circuits on the substrate. The control electronics 50 may operate substantially as discussed previously with respect to FIGS. 8A-8C.

The platen 40 may be any appropriate material that can be acoustically coupled to the receiver, with examples including plastic, ceramic, glass, sapphire, stainless steel, a metal alloy, polycarbonate, a polymeric material, or a metal-filled plastic. In some implementations, the platen 40 can be a cover plate, e.g., a cover glass or a lens glass for a display device or an ultrasonic button. Detection and imaging can be performed through relatively thick platens if desired, e.g., 3 mm and above.

Examples of piezoelectric materials that may be employed according to various implementations include piezoelectric polymers having appropriate acoustic properties, for example between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer and the piezoelectric receiver layer may be selected so as to be suitable for generating and receiving ultrasonic waves. In one example, a PVDF piezoelectric transmitter layer is approximately 28 μm thick and a PVDF-TrFE receiver layer is approximately 12 μm thick. Example frequencies of the ultrasonic waves are in the range of 5 MHz to 30 MHz, with wavelengths on the order of a quarter of a millimeter or less.

FIGS. 8A-8C show example arrangements of ultrasonic transmitters and receivers in an ultrasonic sensor, with other arrangements possible. For example, in some implementations, the ultrasonic transmitter 20 may be above the ultrasonic receiver 30, i.e., closer to the object of detection. In some implementations, the ultrasonic sensor may include an acoustic delay layer. For example, an acoustic delay layer can be incorporated into the ultrasonic sensor 10 between the ultrasonic transmitter 20 and the ultrasonic receiver 30. An acoustic delay layer can be employed to adjust the ultrasonic pulse timing, and at the same time electrically insulate the ultrasonic receiver 30 from the ultrasonic transmitter 20. The delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor 10 is arriving at the ultrasonic receiver 30. In some implementations, the TFT substrate and/or the platen 40 may serve as an acoustic delay layer.

FIG. 9A depicts a 4×4 pixel array of pixels for an ultrasonic sensor. Each pixel may, for example, be associated with a local region of piezoelectric sensor material, a peak detection diode and a readout transistor; many or all of these elements may be formed on or in the backplane to form the pixel circuit. In practice, the local region of piezoelectric sensor material of each pixel may transduce received ultrasonic energy into electrical charges. The peak detection diode may register the maximum amount of charge detected by the local region of piezoelectric sensor material. Each row of the pixel array may then be scanned, e.g., through a row select mechanism, a gate driver, or a shift register, and the readout transistor for each column may be triggered to allow the magnitude of the peak charge for each pixel to be read by additional circuitry, e.g., a multiplexer and an A/D converter. The pixel circuit may include one or more TFTs to allow gating, addressing, and resetting of the pixel.

Each pixel circuit may provide information about a small portion of the object detected by the ultrasonic sensor 10. While, for convenience of illustration, the example shown in FIG. 9A is of a relatively coarse resolution, ultrasonic sensors having a resolution on the order of 500 pixels per inch or higher that are configured with a layered structure. The detection area of the ultrasonic sensor 10 may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the object.

Figure 9B:
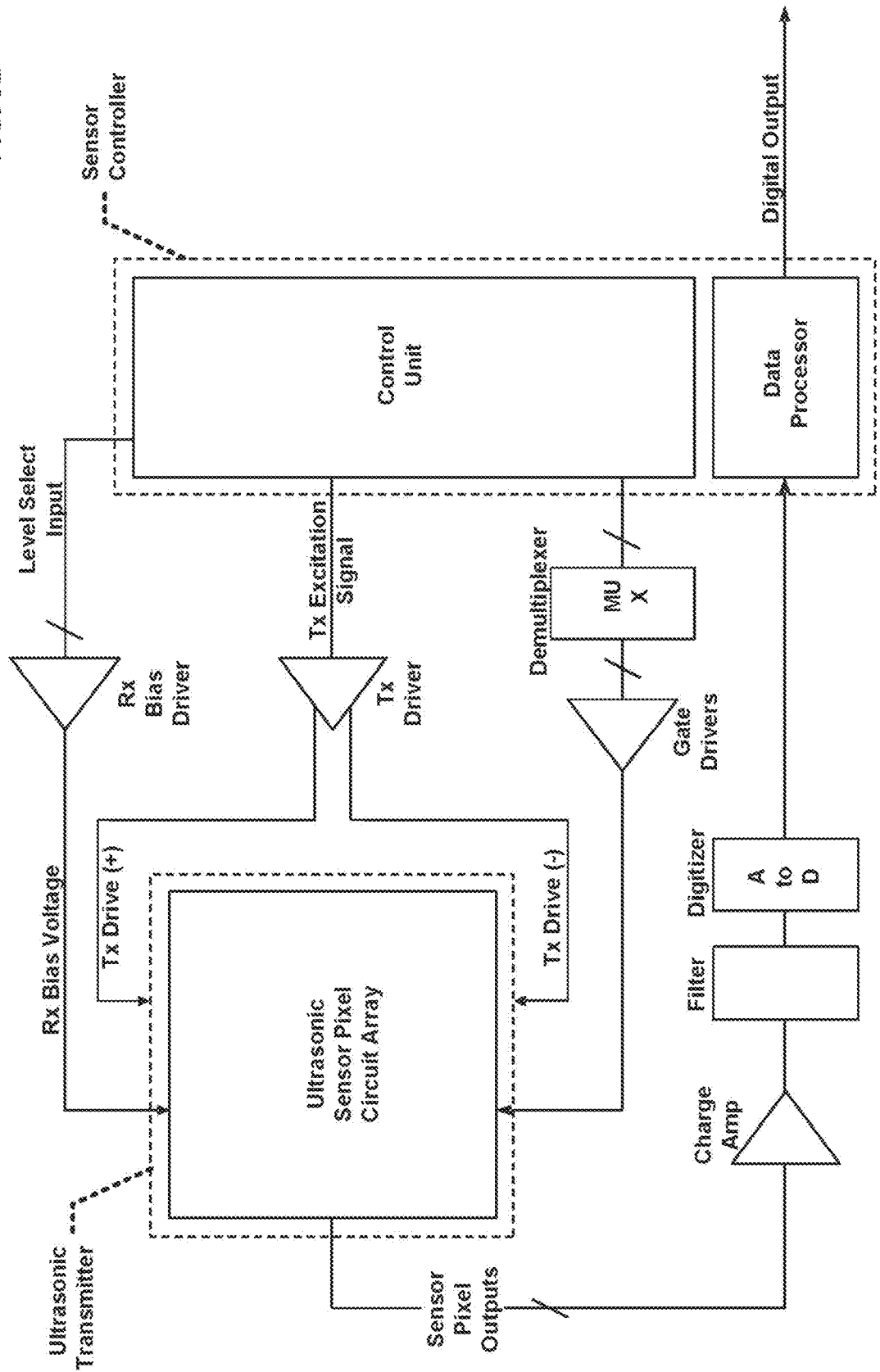
FIG. 9B illustrates an example of a high-level block diagram of an ultrasonic sensor system.

FIG. 9B shows an example of a high-level block diagram of an ultrasonic sensor system. Many of the elements shown may form part of control electronics 50. A sensor controller may include a control unit that is configured to control various aspects of the sensor system, e.g., ultrasonic transmitter timing and excitation waveforms, bias voltages for the ultrasonic receiver and pixel circuitry, pixel addressing, signal filtering and conversion, readout frame rates, and so forth. The sensor controller may also include a data processor that receives data from the ultrasonic sensor circuit pixel array. The data processor may translate the digitized data into image data of a fingerprint or format the data for further processing.

For example, the control unit may send a transmitter (Tx) excitation signal to a Tx driver at regular intervals to cause the Tx driver to excite the ultrasonic transmitter and produce planar ultrasonic waves. The control unit may send level select input signals through a receiver (Rx) bias driver to bias the receiver bias electrode and allow gating of acoustic signal detection by the pixel circuitry. A demultiplexer may be used to turn on and off gate drivers that cause a particular row or column of sensor pixel circuits to provide sensor output signals. Output signals from the pixels may be sent through a charge amplifier, a filter such as an RC filter or an anti-aliasing filter, and a digitizer to the data processor. Note that portions of the system may be included on the TFT backplane and other portions may be included in an associated integrated circuit.

Having described in some detail an example ultrasonic fingerprint sensor, the following discussion addresses characteristics of typical display modules. There are many different technologies that may be used to provide modern, pixelated display devices for use in computer monitors, televisions, mobile devices, and other electronic equipment. Liquid crystal displays (LCDs) and organic light-emitting diode (OLED) displays are examples of two such technologies. As mentioned previously, many of the examples in this disclosure focus on integration of an ultrasonic fingerprint sensor with an LCD-type display architecture, although the general techniques, design rules, and concepts outlined herein may also be applied to other types of display technology as well.

In LCDs, light emitted from a uniformly-illuminated backlight passes through two polarizers that are parallel to one another but oriented with their polarization axes perpendicular to one another. An array of liquid crystal cells, or pixels, is interposed between the two polarizers. Each liquid crystal cell is typically configured such that the liquid crystal inside "relaxes" into a "twisted nematic state" when no voltage is applied to the liquid crystal cell. In the twisted nematic state, the liquid crystal causes polarized light passing through the polarizer interposed between the liquid crystal cell and the backlight to be twisted by 90°, allowing the light to then pass through the remaining polarizer.

When a voltage is applied across a liquid crystal cell, the liquid crystal untwists, causing the initially polarized light passing through the liquid crystal to be twisted to a lesser degree, resulting in less transmission of the light through the second polarizer. The amount of twisting/untwisting of the light is dependent on the voltage applied, allowing the amount of light that passes through the dual-polarizer stack to be modulated. Each such liquid crystal cell may serve as a pixel or a subpixel of a display device. If color output is desired, a color filter array may be placed between the liquid crystal layer and the viewing surface of the display. The color filter array may filter the light that is produced by each pixel such that it is substantially monochromatic, e.g., red, green, or blue. By combining the output of multiple pixels, e.g., a red pixel, a green pixel, and a blue pixel, it may be possible to tune the blended color produced by each such pixel grouping. In such cases, the pixel elements may be referred to as subpixels, and each grouping of subpixels that may be tuned to produce blended light of a particular color may be referred to as a pixel.

OLED displays utilize a more direct technique for providing light. In OLED displays, each pixel, or subpixel, is a single light-emitting diode. Each diode may be individually controlled so as to produce a varying amount of light of a particular color. This bypasses the need for polarizer films and liquid crystal elements and reduces the amount of light that is "wasted" by a display panel as compared with an LCD display panel.

While LCDs and OLED displays use very different techniques for producing light, each type of display requires a mechanism for individually controlling each display pixel or subpixel. To provide such control, these displays utilize an array of thin-film transistors (TFTs). The TFTs for LCDs are commonly fabricated on a clear TFT backplane (also referred to herein as a backplane), e.g., a glass or transparent polymer, to facilitate light transmission from the backlight through the backplane and into the liquid crystal cells. The TFTs for OLED displays may also be manufactured on a clear backplane, although opaque backplanes may be used in such types of displays.

Each display pixel of a display module may include one or more TFTs that are arranged, sometimes in combination with other circuit elements, in a circuit that controls the behavior of that display pixel; such pixel-level circuits are referred to herein as display pixel circuits. The display pixel circuits are arranged on the backplane in an array that is substantially coextensive with the display pixel array. Rather than address all of the display pixel circuits controlling the pixels in the display simultaneously, which would require separate traces for each and every display pixel circuit, the control electronics for such display modules typically sequentially "scan" through each row or column of the display pixel circuits at a very high frequency. To facilitate such control, each column may, for example, have a separate "data" line or trace, and each row may have a separate "scan" line or trace. Alternatively, each row may have a separate data line or trace, and each column may have a separate scan line or trace. Each display pixel circuit may typically be connected to one scan trace and one data trace. Typically, power is applied to the scan traces one at a time and while power is applied to a particular scan trace, the display pixel circuits associated with the powered scan trace may be individually controlled by signals applied to their respective data traces.

The use of a scanning arrangement allows the number of individual traces that can be accommodated for a display to be reduced from potentially millions of traces to hundreds or thousands of traces. This, however, is still an undesirably large number of traces to deal with, and so display panels often include one or more driver chips that communicate with each data trace and scan trace and that translate image data provided from an input or set of inputs into sequential sets of scan signals and data signals that are output to the scan traces and the data traces. Driver chips are typically connected to a processor or other device that provides image data via a flex cable having tens or hundreds of conductors. Thus, a multimillion pixel display may be controlled by a flexible cable having a drastically lower number of conductors, e.g., on the order of 4-6 orders of magnitude lower.

Such driver chips may be considerably smaller in footprint than the display may be. To accommodate such a size differential, the spacing between the data traces and/or scan traces may be reduced between the display pixel circuit array and the driver chip. From the perspective of the driver chip, the traces may appear to "fan out" towards the array of display pixel circuits, referred to herein as "fanout." To accommodate the driver chip or chips and the respective fan-out, the TFT backplane may be sized larger than the array of display pixel circuits. In some cases, the fanout does not terminate at a driver chip, but instead terminates at a flex cable connection. The driver chip in such cases may be located on a component at the opposing terminal end of the flex cable.

Note that the TFT backplane for a display module may, within minimal or no alteration of existing circuit patterning, be designed to accommodate a second array of pixel circuits in the vicinity of the fanout. Such a second array of pixel circuits may be used to provide ultrasonic sensing functionality to a non-display region of the display device; accordingly, the pixel circuits in the second array may be referred to herein as sensor pixel circuits (as opposed to the display pixel circuits discussed earlier). Such sensing functionality may, for example, be used to provide an ultrasonic fingerprint sensing capability. Note that this may be of particular interest in mobile electronic devices to allow for biometric identification measures to be implemented in an aesthetically-pleasing manner on the device to help secure the device and the data therein in the event of loss or theft.

According to aspects of the present disclosure, ultrasonic sensors can be configured to produce high-resolution fingerprint images for user verification and authentication. In some implementations, ultrasonic fingerprint sensors can be configured to detect reflected signals proportional to the differential reflected acoustic energy between an outer surface of a platen and a finger ridge (tissue) and valley (air). For example, a portion of the ultrasonic wave energy of an ultrasonic wave may be transmitted from the sensor into finger tissue in the ridge areas while the remaining portion of the ultrasonic wave energy is reflected back towards the sensor, whereas a smaller portion of the wave may be transmitted into the air in the valley regions of the finger while the remaining portion of the ultrasonic wave energy is reflected back to the sensor. Methods of correcting diffraction effects disclosed herein may increase the overall signal and image contrast from the sensor.

According to aspects of the present disclosure, ultrasonic buttons with fingerprint sensors can be applied for user authentication in a wide range of applications, including mobile phones, tablet computers, wearable devices and medical devices. Ultrasonic authenticating buttons may be utilized in personal medical devices such as drug delivery devices. These devices may be wirelessly connected to track and verify the identification of a user, type of drug, dosage, time of delivery, and style of delivery. The on-device authenticating button can be configured to allow single-user enrollment (e.g., at home or at a pharmacy) and local verification for subsequent consumption of the drug. Rapid identification and verification may appear seamless with the delivery of the drug, as depressions of the ultrasonic button can be configured to invoke user verification and drug delivery. Mobile-connected authenticated drug delivery devices may include personalized pen-injectors and inhalers. Connected injector pens, inhalers and other medical devices may incorporate an ultrasonic button for patient identification and verification.

Note that at least the following three paragraphs, FIGS. 1A-1B through FIGS. 9A-9B and their corresponding descriptions provide transmitter means for transmitting an ultrasonic wave to a finger; receiver means for receiving a reflected ultrasonic wave from the finger; controller means for determining a reflected acoustic energy of the finger based on a difference between average amplitudes of the reflected ultrasonic wave from ridges and valleys of the finger, and determining whether the finger is a spoof based at least in part on the reflected acoustic energy of the finger; means for estimating a background energy received by the receiver means without the finger; means for removing the background energy from the reflected acoustic energy of the finger; means for detecting diffractions of the reflected ultrasonic wave; means for calculating an image with reduced effects of the diffractions of the reflected ultrasonic wave; means for detecting a non-uniform spatial response in the reflected ultrasonic wave; means for adjusting the reflected acoustic energy of the finger to equalize effects of the non-uniform spatial response in the reflected ultrasonic wave; means for identifying regions representing ridges and valleys of the finger; means for determining the reflected acoustic energy of the finger based on the difference between average amplitudes of the reflected ultrasonic wave from the regions representing the ridges and the valleys of the finger; means for recording a number of early cycles of the ultrasonic wave received at the receiver means; means for adjusting the reflected acoustic energy of the finger based on the number of early cycles of the ultrasonic wave received at the receiver means; means for comparing the reflected acoustic energy of the finger to a threshold range; means for determining whether the finger is a spoof based at least in part on whether the reflected acoustic energy of the finger falls within the threshold range; means for determining variations of the reflected acoustic energy of the finger over time; means for determining whether the finger is a spoof based at least in part on the variations of the reflected acoustic energy of the finger over time; means for detecting a change in temperature of the finger; and means for determining whether the finger is a spoof based at least in part on the change in temperature of the finger.

The methodologies described herein may be implemented by various means depending upon applications according to particular examples. For example, such methodologies may be implemented in hardware, and firmware/software. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth® network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with a GPS that includes any one of several GNSS and/or combinations of GNSS. Furthermore, such techniques may be used with positioning systems that utilize terrestrial transmitters acting as "pseudolites", or a combination of satellite vehicles (SVs) and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment a GPS in situations where GPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "GPS signals" and/or "SV signals", as used herein, is intended to include GPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

We claim:

1. A method of detecting a spoof finger by an ultrasonic fingerprint sensor, comprising:
   transmitting, by an ultrasonic transmitter of the ultrasonic fingerprint sensor, an ultrasonic wave to a finger;
   receiving, by an ultrasonic sensor array of the ultrasonic fingerprint sensor, a reflected ultrasonic wave from the finger;
   determining, by a controller of the ultrasonic fingerprint sensor, a reflected acoustic energy of the finger based on a difference between average amplitudes of the reflected ultrasonic wave from ridges and valleys of the finger, wherein determining the reflected acoustic energy of the finger comprises:
      recording a number of early cycles of the ultrasonic wave received at the ultrasonic sensor array; and
      adjusting the reflected acoustic energy of the finger based on the number of early cycles of the ultrasonic wave received at the ultrasonic sensor array; and
   determining, by the controller of the ultrasonic fingerprint sensor, whether the finger is a spoof based at least in part on the reflected acoustic energy of the finger.

2. The method of claim 1, wherein determining the reflected acoustic energy of the finger comprises:
   estimating a background energy received by the ultrasonic sensor array without the finger; and
   removing the background energy from the reflected acoustic energy of the finger.

3. The method of claim 1, wherein determining the reflected acoustic energy of the finger further comprises:
   detecting diffractions of the reflected ultrasonic wave; and
   calculating an image with reduced effects of the diffractions of the reflected ultrasonic wave.

4. The method of claim 1, wherein determining the reflected acoustic energy of the finger further comprises:
   detecting a non-uniform spatial response in the reflected ultrasonic wave; and
   adjusting the reflected acoustic energy of the finger to equalize effects of the non-uniform spatial response in the reflected ultrasonic wave.

5. The method of claim 1, wherein determining the reflected acoustic energy of the finger further comprises:
   identifying regions representing ridges and valleys of the finger; and
   determining the reflected acoustic energy of the finger based on the difference between average amplitudes of the reflected ultrasonic wave from the regions representing the ridges and the valleys of the finger.

6. The method of claim 1, wherein determining whether the finger is a spoof comprises:
   comparing the reflected acoustic energy of the finger to a threshold range; and
   determining whether the finger is a spoof based at least in part on whether the reflected acoustic energy of the finger falls within the threshold range.

7. The method of claim 1, wherein determining whether the finger is a spoof further comprises:
   determining variations of the reflected acoustic energy of the finger over time; and
   determining whether the finger is a spoof based at least in part on the variations of the reflected acoustic energy of the finger over time.

8. The method of claim 7, further comprising:
   comparing the variations of the reflected acoustic energy of the finger over time to variations of the reflected acoustic energy of an authorized user's finger collected during enrollment; and
   determining whether the finger is a spoof based at least in part on a result of the comparison.

9. The method of claim 1, wherein determining whether the finger is a spoof further comprises:
   detecting a change in temperature of the finger; and
   determining whether the finger is a spoof based at least in part on the change in temperature of the finger.

10. An ultrasonic fingerprint sensor, comprising:
    an ultrasonic transmitter configured to transmit an ultrasonic wave to a finger;
    an ultrasonic sensor array configured to receive a reflected ultrasonic wave from the finger; and
    a controller configured to:
       determine a reflected acoustic energy of the finger based on a difference between average amplitudes of the reflected ultrasonic wave from ridges and valleys of the finger,
       record a number of early cycles of the ultrasonic wave received at the ultrasonic sensor array,
       adjust the reflected acoustic energy of the finger based on the number of early cycles of the ultrasonic wave received at the ultrasonic sensor array,
       and determine whether the finger is a spoof based at least in part on the reflected acoustic energy of the finger.

11. The ultrasonic fingerprint sensor of claim 10, wherein the controller is further configured to:
    estimate a background energy received by the ultrasonic sensor array without the finger; and
    remove the background energy from the reflected acoustic energy of the finger.

12. The ultrasonic fingerprint sensor of claim 10, wherein the controller is further configured to:
    detect diffractions of the reflected ultrasonic wave; and
    calculate an image with reduced effects of the diffractions of the reflected ultrasonic wave.

13. The ultrasonic fingerprint sensor of claim 10, wherein the controller is further configured to:
    detect a non-uniform spatial response in the reflected ultrasonic wave; and
    adjust the reflected acoustic energy of the finger to equalize effects of the non-uniform spatial response in the reflected ultrasonic wave.

14. The ultrasonic fingerprint sensor of claim 10, wherein the controller is further configured to:
    identify regions representing ridges and valleys of the finger; and
    determine the reflected acoustic energy of the finger based on the difference between average amplitudes of the reflected ultrasonic wave from the regions representing the ridges and the valleys of the finger.

15. The ultrasonic fingerprint sensor of claim 10, wherein the controller is further configured to:
compare the reflected acoustic energy of the finger to a threshold range; and
determine whether the finger is a spoof based at least in part on whether the reflected acoustic energy of the finger falls within the threshold range.

16. The ultrasonic fingerprint sensor of claim 10, wherein the controller is further configured to:
determine variations of the reflected acoustic energy of the finger over time; and
determine whether the finger is a spoof based at least in part on the variations of the reflected acoustic energy of the finger over time.

17. The ultrasonic fingerprint sensor of claim 16, wherein the controller is further configured to:
compare the variations of the reflected acoustic energy of the finger over time to variations of the reflected acoustic energy of an authorized user's finger collected during enrollment; and
determine whether the finger is a spoof based at least in part on a result of the comparison.

18. The ultrasonic fingerprint sensor of claim 10, wherein the controller is further configured to:
detect a change in temperature of the finger; and
determine whether the finger is a spoof based at least in part on the change in temperature of the finger.

19. An ultrasonic fingerprint sensor, comprising:
transmitter means for transmitting an ultrasonic wave to a finger;
receiver means for receiving a reflected ultrasonic wave from the finger; and
controller means for: determining a reflected acoustic energy of the finger based on a difference between average amplitudes of the reflected ultrasonic wave from ridges and valleys of the finger, wherein the controller means for determining the reflected acoustic energy comprises means for recording a number of early cycles of the ultrasonic wave received at the receiver means, and means for adjusting the reflected acoustic energy of the finger based on the number of early cycles of the ultrasonic wave received at the receiver means; and
controller means for determining whether the finger is a spoof based at least in part on the reflected acoustic energy of the finger.

20. The ultrasonic fingerprint sensor of claim 19, wherein the means for determining the reflected acoustic energy of the finger comprises:
means for estimating a background energy received by the receiver means without the finger; and
means for removing the background energy from the reflected acoustic energy of the finger.

21. The ultrasonic fingerprint sensor of claim 19, wherein the means for determining the reflected acoustic energy of the finger further comprises:
means for detecting diffractions of the reflected ultrasonic wave; and
means for calculating an image with reduced effects of the diffractions of the reflected ultrasonic wave.

22. The ultrasonic fingerprint sensor of claim 19, wherein the means for determining the reflected acoustic energy of the finger further comprises:
means for detecting a non-uniform spatial response in the reflected ultrasonic wave; and
means for adjusting the reflected acoustic energy of the finger to equalize effects of the non-uniform spatial response in the reflected ultrasonic wave.

23. The ultrasonic fingerprint sensor of claim 19, wherein the means for determining the reflected acoustic energy of the finger further comprises:
means for identifying regions representing ridges and valleys of the finger; and
means for determining the reflected acoustic energy of the finger based on the difference between average amplitudes of the reflected ultrasonic wave from the regions representing the ridges and the valleys of the finger.

24. The ultrasonic fingerprint sensor of claim 19, wherein the means for determining whether the finger is a spoof comprises:
means for comparing the reflected acoustic energy of the finger to a threshold range; and
means for determining whether the finger is a spoof based at least in part on whether the reflected acoustic energy of the finger falls within the threshold range.

25. The ultrasonic fingerprint sensor of claim 19, wherein the means for determining whether the finger is a spoof further comprises:
means for determining variations of the reflected acoustic energy of the finger over time; and
means for determining whether the finger is a spoof based at least in part on the variations of the reflected acoustic energy of the finger over time.

26. The ultrasonic fingerprint sensor of claim 19, wherein the means for determining whether the finger is a spoof further comprises:
means for detecting a change in temperature of the finger; and
means for determining whether the finger is a spoof based at least in part on the change in temperature of the finger.

27. A non-transitory medium storing instructions for execution by one or more processors, the instructions comprising:
instructions for transmitting, by an ultrasonic transmitter of the ultrasonic fingerprint sensor, an ultrasonic wave to a finger;
instructions for receiving, by an ultrasonic sensor array of the ultrasonic fingerprint sensor, a reflected ultrasonic wave from the finger;
instructions for determining, by a controller of the ultrasonic fingerprint sensor, a reflected acoustic energy of the finger based on a difference between average amplitudes of the reflected ultrasonic wave from ridges and valleys of the finger;
wherein the instructions for determining the reflected acoustic energy comprises instructions for recording a number of early cycles of the ultrasonic wave received at the receiver means and instructions for adjusting the reflected acoustic energy of the finger based on the number of early cycles of the ultrasonic wave received at the receiver means; and
instructions for determining, by the controller of the ultrasonic fingerprint sensor, whether the finger is a spoof based at least in part on the reflected acoustic energy of the finger.

* * * * *